United States Patent [19]
Ogi

[11] Patent Number: 5,854,938
[45] Date of Patent: Dec. 29, 1998

[54] PARALLEL PROCESSOR APPARATUS IN WHICH DATA IS DIVIDED IN SEQUENTIAL STAGES

[75] Inventor: Yoshifumi Ogi, Kawasaki, Japan

[73] Assignee: Fujitsu Limited, Kawasaki, Japan

[21] Appl. No.: 614,045

[22] Filed: Mar. 12, 1996

[30] Foreign Application Priority Data

Jun. 14, 1995 [JP] Japan .................................. 7-147863

[51] Int. Cl.⁶ .................................................. G06F 17/30
[52] U.S. Cl. .......................................... 395/800.3; 707/7
[58] Field of Search ................................ 395/670, 672, 395/674, 675, 676, 200.31, 200.43, 200.62, 200.68, 872, 800.28, 800.3; 707/7, 104, 101

[56] References Cited

U.S. PATENT DOCUMENTS

| | | | |
|---|---|---|---|
| 5,121,494 | 6/1992 | Dias et al. | 707/7 |
| 5,146,590 | 9/1992 | Lorie et al. | 707/7 |
| 5,179,699 | 1/1993 | Iyes et al. | 707/7 |
| 5,640,554 | 6/1997 | Take | 707/7 |
| 5,671,405 | 9/1997 | Wu | 707/7 |
| 5,724,600 | 3/1998 | Ogi | 395/800.11 |

FOREIGN PATENT DOCUMENTS

| | | |
|---|---|---|
| 0 378 038 A3 | 1/1990 | European Pat. Off. . |
| 0 377 993 A3 | 7/1990 | European Pat. Off. . |
| 0 522 488 A3 | 1/1993 | European Pat. Off. . |

*Primary Examiner*—Larry D. Donaghue
*Attorney, Agent, or Firm*—Armstrong, Westerman, Hattori, McLeland & Naughton

[57] ABSTRACT

A parallel processor apparatus, which enables a blocking work for assuring a bucket write/read performance with a storage quantity in an ordinary range so as to largely improve the bucket write/read performance, has a first dividing unit for dividing data that is an object of a process into plural sets of bucket groups each of which is a set of tuples of plural sorts when the data is transmitted from a first processor group to an intermediate processor group to temporarily store the data in the intermediate processor group. The parallel processor apparatus further includes a second dividing unit for reading each of the plural sets of bucket groups to divide it into buckets each of which is a set of tuples of the same sort when the data is transmitted from the intermediate processor group to a second processor group, and storing the data in the second processor group. The parallel processor apparatus is applicable to a parallel computer system having plural processors concurrently operating in parallel to execute a predetermined task.

32 Claims, 15 Drawing Sheets

PARALLEL PROCESSOR APPARATUS IN WHICH DATA IS DIVIDED IN SEQUENTIAL STAGES

BACKGROUND OF THE INVENTION

1) Field of the Invention

The present invention relates to a parallel processor apparatus such as a parallel computing system or the like, in which plural processors concurrently operate in parallel to execute a certain task.

2) Description of the Related Art

Description will first be made of a scheme of a general parallel computer system (a parallel processor apparatus). This scheme is common to the present invention which will be described later.

This general parallel computing system (a system to which the present invention is applied) meets the following conditions.

Plural processors configuring the system do not commonly use storages and secondary storage apparatus. In other words, a certain storage or a certain secondary storage apparatus is accessed by only one processor during an operation of the system.

The plural processors are interconnected by a network mechanism which can transfer data from an arbitrary processor to another arbitrary processor.

Referring now to FIG. 9, description will be made of an example of a structure of a general parallel computer system. In FIG. 9, reference numerals 10-1 through 10-N are processor modules (hereinafter, abbreviated as PMs in occasion) configuring a parallel computer system. These PMs operate in parallel, which are communicably interconnected by a network mechanism 11.

The network mechanism 11 logically enables all-to-all communication of arbitrary length data among the PMs 10-1 through 10-N. In practice, the network mechanism 11 may be what can establish a communication by exchanging a fixed length bucket plural times between the PMs or what can transfer arbitrary length data between arbitrary processors from a macroscopic point of view although not being able to establish a certain connection between the PMs in a microscopic length of time due to a congestion phenomenon (a processor in communication causing a congestion is made to wait and the communication is delayed).

Each of the PMs 10-1 through 10-N has a CPU 20, a storage 21, an access mechanism 22 and an I/O mechanism 23.

The CPU 20 is incorporated in each of the PMs 10-1 through 10-N to control operations of the access mechanism 22 and an I/O mechanism 23, as well as having a function to read data existing on the storage 21 or write data onto the storage 21.

The storage 21 is incorporated in each of the PMs 10-1 through 10-N. It is possible to get an access to a data block in an arbitrary length in an arbitrary position on the storage 21 from the CPU 20, the access mechanism 22 and the I/O mechanism 23.

The access mechanism 22 is incorporated in each of the PMs 10-1 through 10-N to serve to get an access to the network mechanism 11 connecting the PMs 10-1 through 10-N with each other. The access mechanism 22 has (at least logically) a function of transferring a data block in an arbitrary length existing in a position on its own storage (at an address of the storage 21) designated by the CPU 20 to another processor designated by the CPU 20, and a function of storing a data block given by the network mechanism 11 in a position on its own storage designated by its own CPU 20.

The I/O mechanism 23 is incorporated in each of the PMs 10-1 through 10-N to get an access to a secondary storage apparatus 24 connected to its own PM 10-1, 10-2, . . . or 10-N. The I/O mechanism 23 has (at least logically) a function of writting a data block in an arbitrary length existing in a position on its own storage designated by the CPU 20 into a region of the secondary storage apparatus 24 designated by the CPU 20, and a function of writting a data block in a designated region of the secondary storage apparatus 24 designated by the CPU 20 into a position on its own storage designated by the CPU 20.

Incidentally, the secondary storage apparatus 24 connected to each of the PMs 10-1 through 10-N is, for example, a magnetic disk apparatus as will be described later with reference to FIG. 12. Each of the PMs 10-1 through 10-N may have a secondary storage apparatus 24 connected thereto. In a static sense, one secondary storage apparatus 24 has access buses for plural PMs. In terms of a process within a range described here, it is assumed that the number of the PMs accessible to one secondary storage apparatus 24 is one.

Next, a description will be made of an outline of a process performed by the above general parallel computer system (conditions satisfied by this process) with reference to FIGS. 10 and 11. Incidentally, this outline of the process is common to the present invention described later.

A logical process in the above general parallel computer system will be now described with reference to FIG. 10.

It is assumed that there is one file or one table defined by an RDB (Relational DataBase). Hereinafter, description will be made by way of an RDB process. This is a source table (Source Table) 400 shown in FIG. 10.

One tuple (a data unit which can be processed separately and individually) 500 is extracted from the source table 400, and a grouping function f (401) is applied to the tuple 500.

According to a result of this (an output value of the grouping function f), it is determined which tuple group (Bucket 402, 403 or 404) this tuple 500 belongs to. The tuple 500 is added to a determined bucket 402, 403 or 404.

A bucket group generated in this manner is stored in the secondary storage apparatus (refer to reference numeral 24 in FIG. 9), and becomes input information in the next process 405, 406 or 407 applied to each of the buckets 402 through 404 independently.

The process described with reference to FIG. 10 is packaged in the above general parallel computer system as shown in FIG. 11.

Namely, an input table (the source table 400 in FIG. 10) 800 is divided and stored separately in the secondary storage apparatus group connected to the PMs 600 through 602 belonging to a first processor group 60. Subsets 900 through 902 of the input table 800 under the respective PMs 600 through 602 are called subtables.

The extraction of the tuple and the application of the grouping function described with reference to FIG. 10 are executed in parallel by the individual PMs 600 through 602 belonging to the first processor group 60. An object of the tuple extraction is each of the subtables 900 through 902.

The tuple group (a set of the tuples of the same sort) classified by being applied the grouping function should be finally stored in a second processor group 70. It is not demanded here that the first processor group 60 is in an exclusive relation to the second processor group 70. In other words, the first processor group 60 and the second processor group 70 may be the same processor group, or in a relation where some processors overlaps to each other, or quite different from each other.

One bucket make up of the tuples of the same sort may be collectively stored in one processor belonging to the second processor group 70, or stored separately in a certain number of processors belonging to the second processor group 70. A demand here is that "data of a specific bucket only may be selected and read out from the second processor group 70 upon execution of the next process". With a data structure realizing this, data (the input table 800 stored in the first processor group 60) is divided into plural portions 1000 through 1299 and stored in the PMs 700 through 702 (the secondary storage apparatus 24) belonging to the second processor group 70, as shown in FIG. 11.

It is noted here that arrows between the first processor group 60 and the second processor group 70 do not necessarily mean a direct communications on the network. FIG. 11 is intended to show a form of storing input information and a form of storing output (result) information, and to pay an attention that there is no demand for a transfer process between the first processor group 60 and the second processor group 70. The present invention which will be described later is a technique of how to realize the arrows from the first processor group 60 to the second processor group 70 shown in FIG. 11.

Meanwhile, a work of dividing a tuple group into plural groups (buckets) using a grouping function (classification using a value of hashing or a specific column, for example) is extremely general in an RDB process. For instance, "Group By" phrase in the SQL statement is to clearly demand for a group dividing process, or hash join which is a typical system of join operations with the above structure features group sorting of tuples with a hash function.

In a system called a parallel database machine or a distributed database system, a tuple group that should be logically one table from a viewpoint of a terminal user is often divided into plural processors which do not directly use storages or secondary storage apparatus in common. This produces an effect that a performance of a conditional retrieving process on the same table is largely improved by an execution of a processor group performing the same retrieving process on subsets of a table.

In an environment like this, the above group dividing process is realized by applying a designated grouping function by each of the processors to all tuples included in a subset (hereinafter, called a subtable) of its own table and logically summing up results of the application, that is, "by sending results (subbuckets) divided into groups of subtables generated by respective processors to a processor group that should store the results therein, linking the subbuckets belonging to the same bucket to finally generate a bucket on the side of a processor having received the results and storing the bucket into secondary storage apparatus of its own".

On this occasion, from properties (1) through (3) of the secondary storage apparatus 24 described below, a large difference in performance of the process occurs in this group dividing process and the next process (that is, the next process performed by reading out each of generated buckets) depending on a system of storing each bucket generated in this group dividing process into the secondary storage apparatus.

FIG. 12 schematically shows a magnetic disk apparatus as the typical secondary storage apparatus 24. In FIG. 12, reference numerals 300 through 303 denote magnetic media rotating at a high speed, reference numeral 304 denotes a rotary shaft of the magnetic media 300 through 303. The rotary shaft 304 is coupled to a motor now shown. Reference numerals 305 through 312 are head units each made up of a magnetic head and a head arm. These head units 305 through 312 each is so disposed as to pinch the corresponding magnetic medium 300, 301, 302 or 303 from the both sides. Only the head units 305 and 306, . . . or 311 and 312 selected by a part of an address given from the outside can receive and give data from and to the corresponding magnetic medium 300, . . . or 303. Further, reference numeral 313 is a supporting member for supporting the head arms of the head units 305 through 312. The supporting member 313 moves each of the head units 305 through 312 to a position in which the head unit 305, 306, . . . or 312 can read data at an address given from the outside.

(1) In the magnetic disk apparatus as the typical secondary storage apparatus 24 whose outline is shown in FIG. 12, any one of the magnetic media 300 through 303 rotating at a high speed designated by a high order of an address given from the outside is selected, the head unit (the magnetic head) 305 and 306, . . . or 311 and 312 physically moves to a part whose distance from the center is designated by a middle order of the address given from the outside, and data is written into and read from a region designated by a low order of the address given from the outside on a circumference accessed by the magnetic head.

(2) The current magnetic disk apparatus described above requires a relatively long time to alter a position of the above head units 305 through 312 (including a time required to select and switch the rotating media since a head positioning requires a fine adjustment in a strict sense), as compared with a rotating speed of the magnetic media 300 through 303. For this, in order to improve a performance of an input-output process on the magnetic disk apparatus, the smaller the number of times and a distance of movement of the head units 305 through 312 required to input and/or output data in a specific quantity, the larger the effect is. A region on the secondary storage apparatus which requires a minimum number of times and a minimum distance of movement of the head when data in a certain volume is stored is tentatively called "a physically continuous region", hereinafter. In the following description, a region flocks within a specific area on the magnetic media in the secondary storage apparatus is not defined as "the physically continuous region".

(3) If a certain I/O access is an access to such physically continuous region and a quantity of transferred data is above a certain value, it can be said that a performance of the I/O process fully utilizes a performance of the secondary storage apparatus. A capacity expected to the physically continuous region in terms of this I/O access is several hundreds KB in the case of the current magnetic disk apparatus. Below this value, the I/O performance is rapidly decreased. To the contrary, above this value, an effect of an improvement of the performance is small.

Since a quantity of data handled in the database (DB) process is enormous, the I/O performance mostly determines a performance of the database process, in general. For this, an effect that a capacity of a physically continuous region in terms of the I/O access above mentioned can be assured is large. A simple example of this is shown in FIGS. 13 and 14.

FIG. 13 shows an example of a DB process having a poor access efficiency. In the left part in FIG. 13, a tuple group that should be entered into the secondary storage apparatus 24 are shown in an array in the order being thrown in according to an I/O demand. Here, assumed that two "physically continuous regions" 1200 and 1201 exist. In the example shown in FIG. 13, the head goes back and force between the two physically continuous regions 1200 and 1201 since the tuples that should be entered are alternatingly thrown into the two physically continuous regions 1200 and 1201 so that the I/O performance is largely degraded.

On the other hand, FIG. 14 shows an example of a DB process having a good access efficiency. In the example shown in FIG. 14, so-called "collective write" is feasible since tuples that should be entered into the same region are continuously thrown in so that it is necessary to move the head once between the regions.

Therefore, if a reading performance at the time of an execution of the next process is intended to be assured at least, one bucket should be divided into "physically continuous regions" in number as small as possible and stored therein. However, in a DB process, a capacity of one bucket is, in general, in the order of several megabytes. In consequence, if the all are collected in one "physically continuous region", it is known from the above discussion that a performance of the secondary storage apparatus is not remarkably improved. As a result, practical demands are two points (A) and (B) as follows.

(A) A size (approximately several hundreds KB) satisfying a demand in terms of a capacity of "a physically continuous region" for the purpose of assuring the above I/O access performance is assumed to be one I/O access unit. All data in one I/O access unit are entered in one "physically continuous region" in the secondary storage apparatus, and read out from said one "physically continuous region" as well.

(B) Upon writing bucket data, the number of sorts of the buckets mixedly existing in one I/O access unit is made small as much as possible. If possible, the number of sorts of the buckets mixedly existing in all I/O access units is made one.

It has been, difficult, however, to meet the above demands (A) and (B) up to now. In the existing technique, since the number of sorts of buckets which possibly arrive at one PM is extremely large, preparing a blocking buffer in a capacity integral multiple of the above I/O access unit for each sort of the buckets is to demand of providing an enormous storage capacity which is not realistic in each of the PMs 700 through 702 on the storing side (i.e., the second processor group 70 which is on the receiver side).

Next, the existing technique will be described with reference to FIG. 15.

FIG. 15 shows an internal structure of one of the PMs 700 through 702 (the PM 702 here) belonging to the second processor group 70 shown in FIG. 11.

The existing technique is featured that, at least, the PMs 600 through 602 on the transmitter side and the PMs 700 through 702 on the receiver (storing) side shown in FIG. 11 are logically directly connected with each other via the network. Namely, in terms of tuples or buckets, an output stream of the PMs 600 through 602 are sent to the PMs 700 through 702 which are a final destination of the storing without processed particularly.

In the existing technique, the PMs 600 through 602 on the transmitter side each is given a correspondence of the bucket with the PM 700, . . . or 702 on the receiver side. When a tuple belonging to a certain bucket is sent out, the PMs 600 through 602 positively designate the PM 700, 701 or 702 satisfying the correspondence and send the tuple.

Each of the PMs 700 through 702 on the receiver side receives data as a stream (refer to "Input Tuple Stream" in FIG. 15) of tuples from each of these plural PMs 600 through 602 on the transmitter side. In each of the PMs 700 through 702, the data is classified according to the sort of the bucket and stored in blocking buffers 21A each prepared for each sort of buckets that each of the PMs 700 through 702 (the PM 702 in FIG. 15) should be in charge. A capacity of the blocking buffers 21A is, at least, a value obtained by multiplying the above I/O unit with the number of sorts of buckets that should be stored in each of the PMs 700 through 702. Incidentally, a region of the blocking buffers 21A is set within a storage (a main storage) 21 shown in, for example, FIG. 9.

Each of the PMs 700 through 702 writes contents (a part corresponding to a bucket) of the blocking buffers 21A as to a bucket whose accumulated quantity reaches the I/O access unit into the secondary storage apparatus 24.

However, in the case of the above system, the number of buckets that the PMs 700 through 702 on the storing side should take charge is quite enormous, in general. In the case of hash join, for example, buckets in number as approximately the same as a value obtained by dividing a capacity of the database with a storage capacity of each of the PMs 700 through 702 are necessary. For instance, if a database capacity of approximately 100 GB is processed by a PM having a main storage (the storage 21) of approximately 64 MB, approximately 1600 buckets become necessary as a whole.

If a correspondence between a bucket and a PM in the PMs 700 through 702 on the receiver side is limited, in other words, if a certain bucket is processed only by a specified PM on the receiver side, there might occur remarkable non-uniformity in quantity of data processed by the PMs, since it is generally impossible to predict a capacity of each bucket. It is therefore desirable that one bucket is uniformly distributed to every PMs. This means that it is difficult to reduce the number of sorts of the buckets processed by one PM.

For instance, when 32 PMs each having a main storage capacity of 64 MB are provided as PMs on the storing side, assuming that database having a capacity of 100 GB should be divided into 1.6K buckets and stored, by controlling so that a quantity of data belonging to the same bucket is in equal among the PMs on the storing side, an average number of the buckets per PM is also approximately 1.6K. The number of the PMs taking part in the process does not concern with an average number of the buckets.

If an I/O access unit satisfying the above demands is 256 KB, the above blocking buffer 21A is required to prepare the above capacity for 1.6K buckets. A main storage (the storage 21) of approximately 400 MB is therefore necessary.

As stated above, an upper limit of the main storage which can be prepared is 64 MB. In consequence, it is practically impossible to perform the process described here, making it impossible to assure a capacity in terms of the I/O access unit, that is, causing degradation of a writing performance or a reading performance. In this case, since an average block length at the time of I/O access is 41 KB at most, a general DE (Disk Enclosure) can provide only a performance below one-fifth the case where the above demand for 512 KB is satisfied.

On the other hand, it is not, of course, allowed that the block length is below the maximum length of one tuple. A tuple of approximately 32 through 64 KB is usually allowed in the current RDB system so that the existing technique might not satisfy this demand in the above case (a 41 KB buffer length).

For this, the above blocking buffer 21A is placed in a known virtual storage space to avoid this problem in many of commercial databases. However, this necessitates one read/write to the secondary storage apparatus for one tuple mostly in certain, which leads to degradation of a performance of the bucket dividing process although a blocking becomes feasible and a performance of the next process is assured.

This invention can provide a technique satisfying the demands (A) and (B) stated above without causing degradation of a performance of the whole process while consuming only a realistic storage capacity.

This invention does not require that only one PM takes in charge of a certain bucket since the number of buckets handled by one PM is reduced. Whereby, it is possible to prevent occurrence of bias of loads among the PMs due to a difference in capacitance among the buckets usually occurring.

SUMMARY OF THE INVENTION

As stated above, an object of the present invention is to enable a blocking work for assuring a bucket write/read performance with a storage quantity in an ordinary range without causing degradation of a bucket dividing process so as to largely improve the bucket write/read performance.

The present invention therefore provides a parallel processor apparatus having plural processors operating in parallel, the plural processors joining to one task to execute the task as a whole, and data that is an object of a process for the task being handled as a data unit (hereinafter called a tuple) being able to be processed individually and separately in each of the processors, the parallel processor apparatus comprising a first processor group for distributing the data that is an object of the process to store the data in advance, a second processor group for storing the data that is an object of the process sent from the first processor group in a state where the data is divided into buckets each of which is a set of tuples of the same sort, an intermediate processor group included in the plural processors for receiving the data that is an object of the process from the first processor group to temporarily store the data therein, then sending the data to the second processor group, a first dividing unit for dividing the data that is an object of the process into plural sets of bucket groups each of which is a set of tuples of plural sorts when the data is transmitted from the first processor group to the intermediate processor group to temporarily store the data in the intermediate processor group, and a second dividing unit for reading each of the plural sets of bucket groups divided by the first dividing unit and temporarily stored in the intermediate processor group, dividing each of the bucket groups into buckets each of which is a set of tuples of the same sort when the data is transmitted from the intermediate processor group to the second processor group to store the buckets in the second processor group.

According to the parallel processor apparatus of this invention, the intermediate processor group is interposed to perform a data dividing process in at least two stages so that data may be divided into buckets to be stored in each of the processors belonging to the second processor group without providing buffers in number equal to the number of sorts of tuples. This invention thus enables a blocking work for assuring a bucket write/read performance with a storage quantity in an ordinary range without causing degradation of a performance of the bucket dividing process so as to largely improve the bucket write/read performance as a result.

BRIEF DESCRIPTION OF THE DRAWINGS

DESCRIPTION OF THE PREFERRED EMBODIMENTS (a) Description of Aspect of the Invention FIG. 1 is a block diagram showing an aspect of the present invention. In FIG. 1, reference numeral 1 denotes plural processors operating in parallel. These plural processors join in one task to execute the task as a whole. Each of the processors 1 handles data that is an object of a process in the task as a data unit (hereinafter called a tuple) which can be processed separately and individually.

Figure 1:
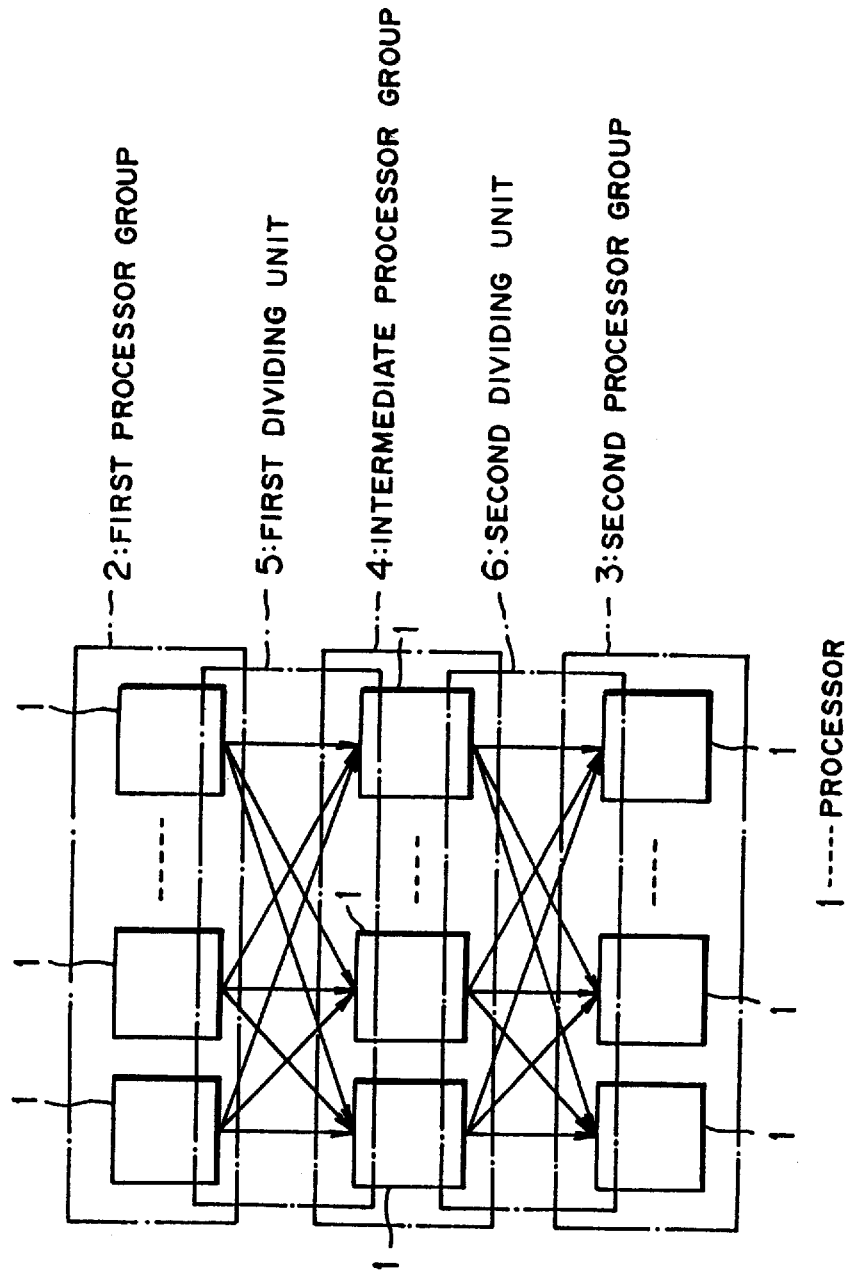
FIG. 1 is a block diagram showing an aspect of this invention.

The plural processors 1 configuring a parallel processor apparatus of this invention include a first processor group 2, a second processor group 3 and an intermediate processor group 4.

The first processor group 2 is a group of the processors 1 which distributes and stores data that is an object of a process therein in advance. The second processor group 3 is a group of the processors 1 which stores therein the data that is an object of the process transmitted from the first processor group 2 in a state where the data is divided into buckets which is a set of only tuples of the same sort. The intermediate processor group 4 receives the data that is an object of the process from the first processor group 2 and temporarily stores it therein, after that, transmits it to the second processor group 3.

The parallel processor apparatus of this invention is provided with a first dividing unit 5 and a second dividing unit 6.

The first dividing unit 5 divides the data that is an object of the process into plural sets of bucket groups each of which is a set of tuples of plural sorts when the data is transmitted from the first processor group 2 to the intermediate processor group 4, and temporarily stores them in the intermediate processor group 4. The second dividing unit 6 reads each of the plural sets of bucket groups divided by the first dividing unit 5 and temporarily stored in the intermediate processor group 4, and divides each of the bucket groups into buckets each of which is a set of tuples of the same sort when the data is transmitted from the intermediate processor group 4 to the second processor group 3 to store the buckets in the second processor group 3.

A grouping function used to classify each of the tuples composing the data that is an object of the process may be set in advance to the first dividing unit 5, and the first dividing unit 5 may perform a bucket dividing process on the basis of a bucket identifier as an output value of the grouping function obtained by applying the grouping function to each of the tuples. Similarly, a grouping function used to classify each of the tuples composing the data that is an object of the process may be set in advance to the second dividing unit 6, and the second dividing unit 6 may perform a bucket dividing process on the basis of a bucket identifier as an output value of the grouping function obtained by applying the grouping function to each of the tuples.

The plural processors 1 may include a control processor which manages conditions of operations of the first processor group 2, the second processor group 3 and the intermediate processor group 4, and makes the first dividing unit 5 and the second dividing unit 6 execute dividing processes while making operations of the first processor group 2, the second processor group 3 and the intermediate processor group 4 be in synchronism therewith.

The first dividing unit 5 may include a first load leveling unit which sends tuples belonging to the same bucket group to each of the processors 1 belonging to the intermediate processor group 4 uniformly or approximately uniformly to level a load on each of the processors 1 belonging to the intermediate processor group 4. Similarly, the second dividing unit 6 may include a second load leveling unit which sends tuples belonging to the same bucket group to each of the processors 1 belonging to the second processor group 3 uniformly or approximately uniformly to level a load on each of the processors 1 belonging to the second processor group 3.

In the parallel processor apparatus of this invention described above with reference to FIG. 1, the intermediate processor group 4 is interposed between the first processor group 2 and the second processor group 3 when tuple data is transferred from the first processor group 2 to the second processor group 3.

When transmitted from the first processor group 2 to the intermediate processor group 4, data that is an object of a process is divided into plural sets of bucket groups each of which is a set of tuples in plural sorts by the first dividing unit 5, then temporarily stored in the intermediate processor group 4.

After that, when the data is transmitted from the intermediate processor group 4 to the second processor group 3, each of the plural sets of bucket groups temporarily stored in the intermediate processor group 4 is read out by the second dividing unit 6 to be divided into buckets each of which is a set of tuples of the same sort, and finally stored in the second processor group 3.

As above, the intermediate processor group 4 is interposed to perform a data dividing process in at least two stages, thereby storing data in a state where the data is divided into buckets in each of the processors 1 belonging to the second processor group 3 without providing buffers in a number equal to the number of all sorts of the tuples (the number of all sorts of the buckets) in each of the processors 1.

It is therefore possible to perform a blocking work for assuring a bucket write/read performance with a storage quantity in an ordinary range without causing degradation of a performance of the bucket dividing process.

Incidentally, the bucket dividing process in the first dividing unit 5 may be performed on the basis of a bucket identifier obtained by applying a grouping function to each of the tuples. The bucket dividing process in the second dividing unit 6 may also be performed on the basis of a bucket identifier obtained by applying a grouping function to each of the tuples.

With the control processor, the first dividing unit 5 and the second dividing unit 6 perform dividing processes while the first processor group 2, the second processor group 3 and the intermediate processor group 4 operate in synchronism, thereby dividing data which is distributed and placed in each of the processors 1 in consideration of differences in sorts of the tuples.

Further, the first load leveling unit levels a load on each of the processors 1 belonging to the intermediate processor group 4. The second load leveling unit levels a load on each of the processors 1 belonging to the second processor group 3. Namely, in the parallel processor apparatus of this invention, the number of the processors taking a charge of buckets of a certain sort is not limited and a load on each of the processors is leveled, thereby preventing occurrence of unevenness of loads among the processors due to differences in capacity among the buckets occurring generally.

As stated above in detail, the parallel processor apparatus of this invention performs a data dividing process in at least two stages by interposing the intermediate processor group 4. It is therefore possible to divide data into buckets and store them in each of the processors 1 belonging to the second processor group 3 without providing buffers in number equal to the number of sorts of tuples. This enables a blocking work for assuring a bucket write/read performance with a storage quantity in an ordinary range without causing degradation of a performance of the bucket dividing process. As a result, this invention has an effect of largely improving the bucket write/read performance.

The number of the processors taking charge of buckets of a certain sort is not limited to one, but a load on each of the processors 1 is leveled so that the number of buckets handled by one processor is reduced and occurrence of unevenness of loads among the processors 1 due to differences in capacity among the buckets generally occurring is prevented with certainty. This can effectively prevent a decrease of an entire throughput due to a load concentration on a specific processor so as to contribute to an improvement of the processing performance.

(b) Description of an Embodiment of the Invention

Hereinafter, description will be made of an embodiment of this invention referring to the drawings.

Figure 2:
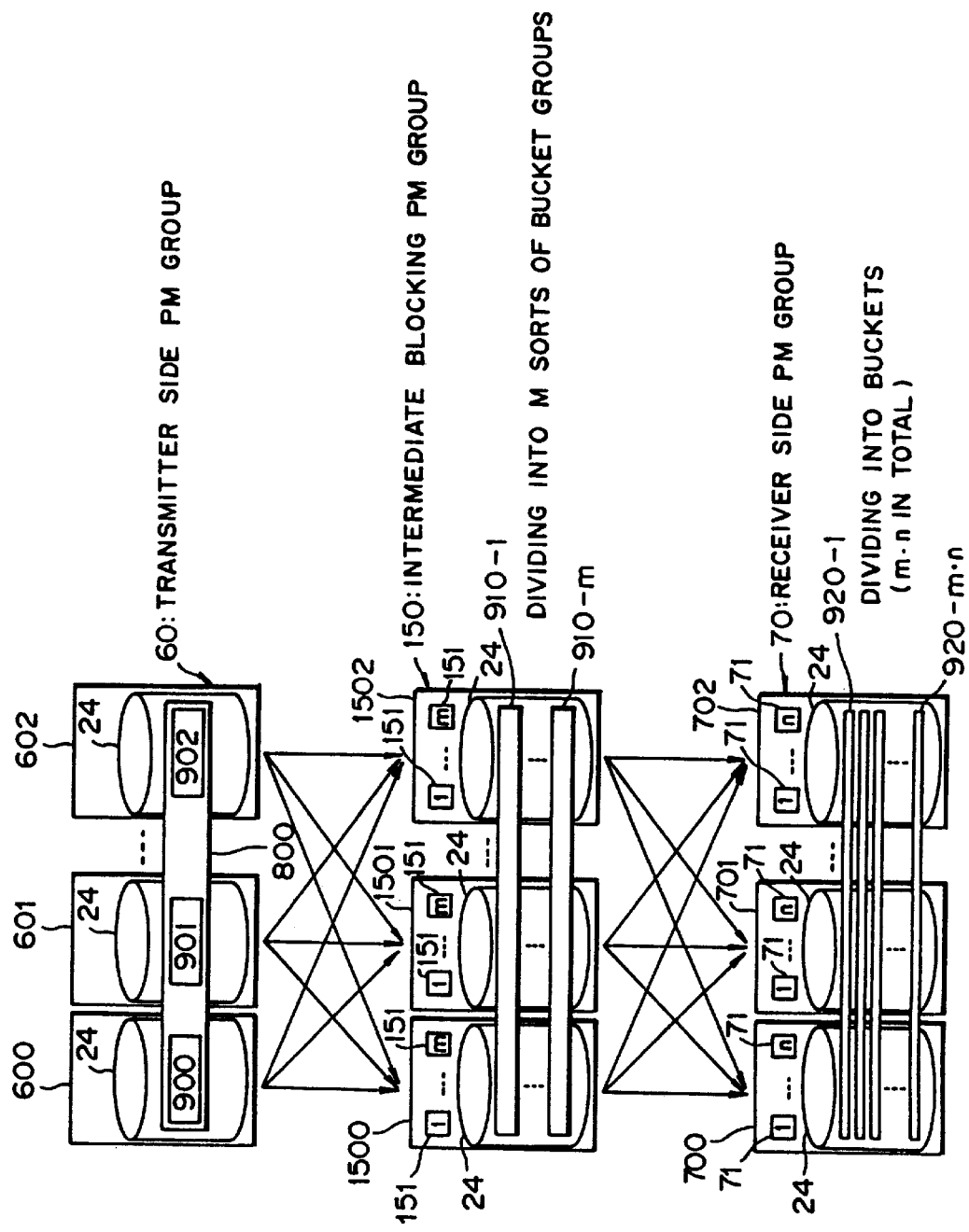
FIG. 2 is a block diagram illustrating a fundamental structure and an operation of a parallel processor apparatus according to an embodiment of this invention.

Now referring to FIG. 2, description will be first made of a fundamental structure and an operation of a parallel processor apparatus as an embodiment of this invention.

As shown in FIG. 2, in the parallel processor apparatus according to this embodiment, an intermediate blocking PM group 150 is interposed as an intermediate processor group between a transmitter side PM group (a first processor group) 60 and a receiver side PM group (a second processor group) 70.

As a first step (a processing operation by a function as the first dividing unit 5 described above with reference to FIG. 1), an all-to-all communication is implemented between the transmitter side PM group 60 and the intermediate blocking PM group 150, a bucket group is roughly divided into bucket groups 920-1 through 920-m of m sorts, and each of the bucket groups is stored in the secondary storage apparatus 24 connected to each of the PMs 1500 through 1502 belonging to the intermediate blocking PM group 150. Here, each of the bucket groups 920-1 through 920-m of m sorts includes tuples of n sorts (buckets of n sorts).

Description will be next made of a process by the transmitter side PM group 60 at the first step. Each of the PMs 600 through 602 belonging to the PM group 60 reads out a tuple from its own subtable (stored in the secondary storage apparatus 24) 900, 901 or 902 that is an object of the process, and sends the tuple to the intermediate blocking PM group 150 according to an arbitrary distribution theory. Since the description will be here made assuming that loads on the PMs are not positively leveled, it is not specified to apply a grouping function such as a hash function on either the transmitter side PM group 60 or the intermediate blocking PM group 150.

Description will be next made of a process by the intermediate blocking PM group 150 at the first step. Each of the PMs 1500 through 1502 belonging to the intermediate blocking PM group 150 grasps correspondences of bucket identifiers to bucket groups of m sorts. The bucket identifiers are designated from the outside in advance, or determined from the number of all sorts of the buckets in a computing system given in advance as a rule. A certain bucket always belongs to one bucket group at most.

Each of the PMs 1500 through 1502 receives a tuple from each of the transmitter side PMs 600 through 602. If a grouping function is not applied to the tuple in each of the transmitter side PMs 600 through 602, or if a bucket identifier is not added to a sent tuple as a result of an application of the grouping function (the output value), the grouping function is applied to the tuple to determine a bucket identifier for a bucket to which the tuple belongs to.

Each of the PMs 1500 through 1502 applies the above correspondence to the bucket identifier of the tuple to grasp a bucket group to which the tuple should belong to.

Figure 9:
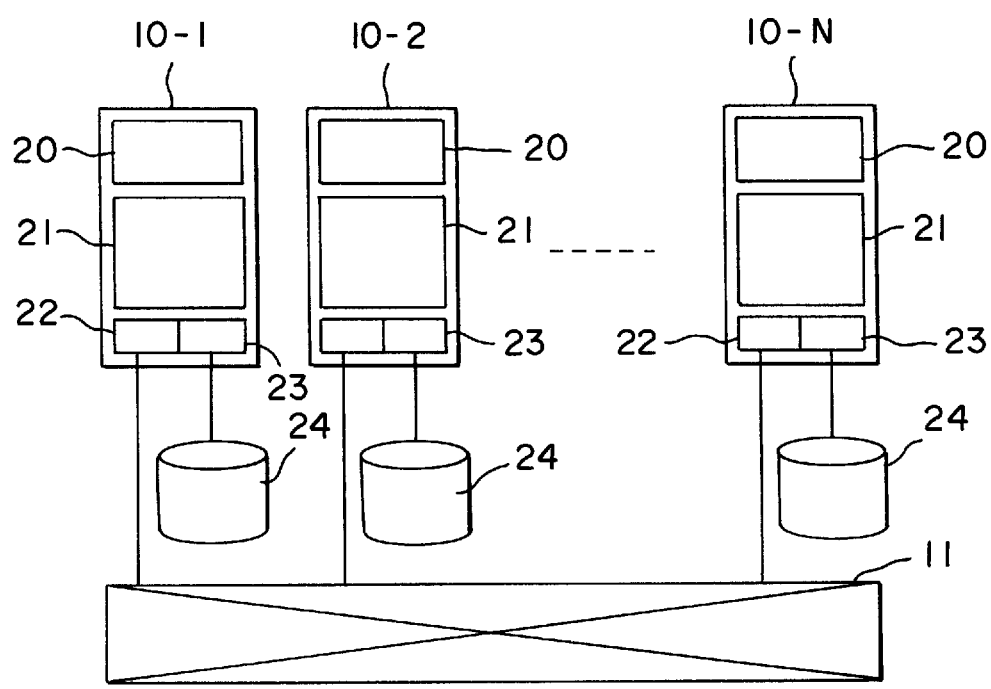
FIG. 9 is a block diagram showing an example of a structure of a general parallel computer system.
Figure 10:
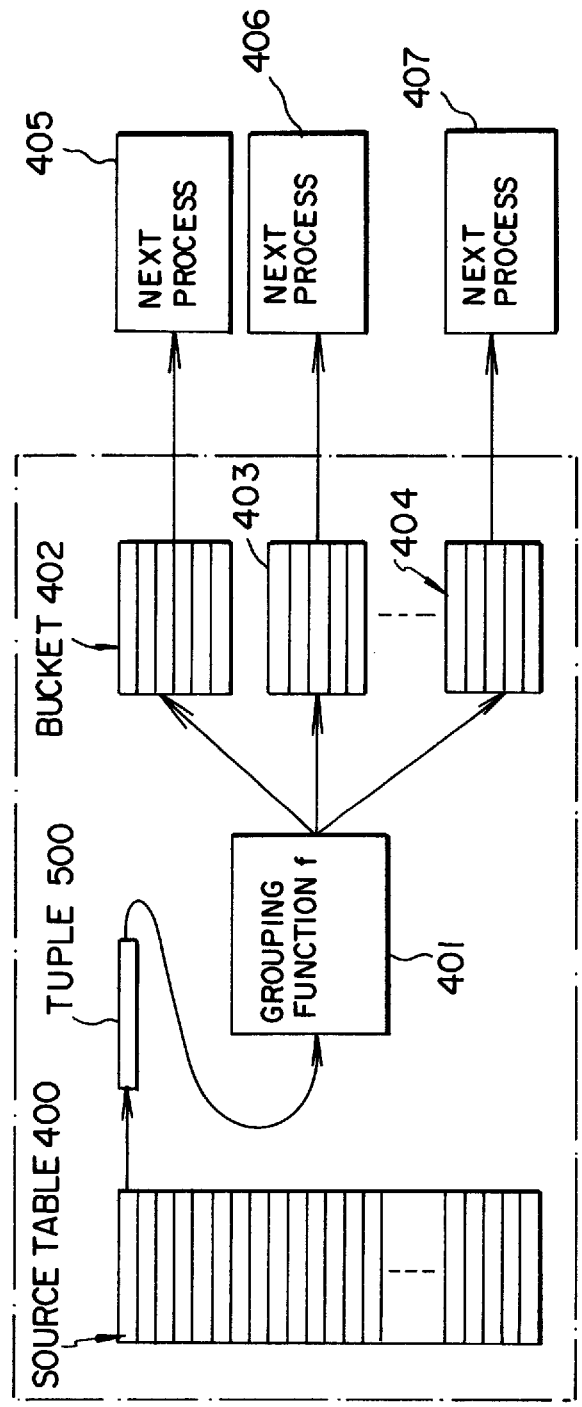
FIG. 10 is a block diagram illustrating a logical process in the general parallel computer system.
Figure 11:
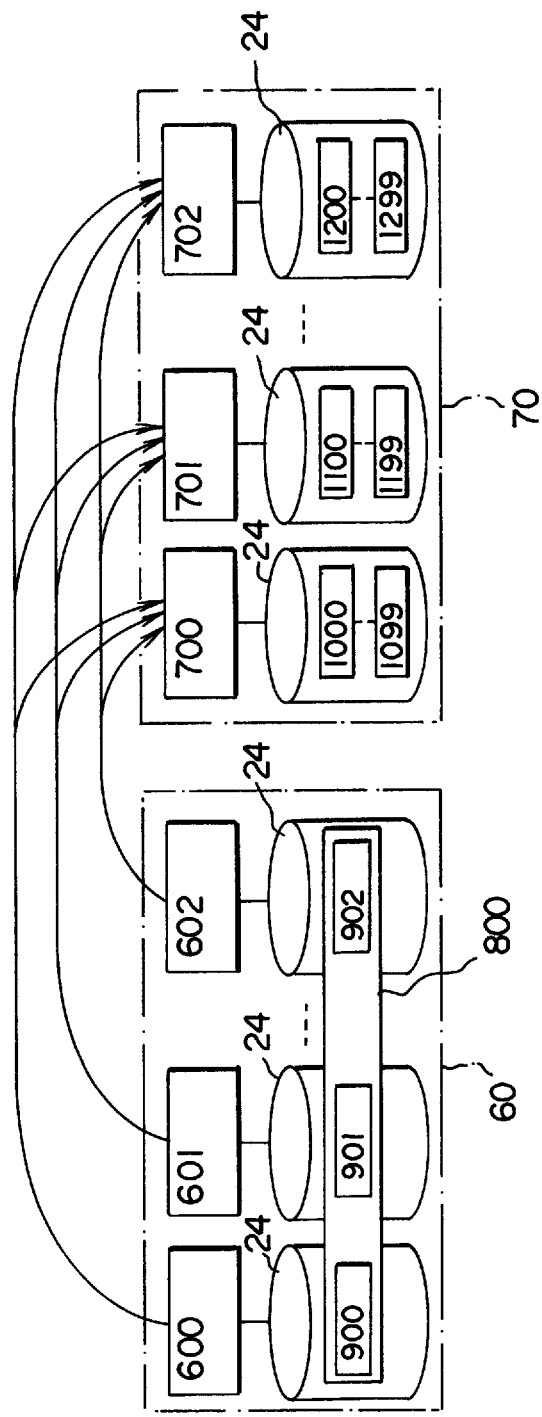
FIG. 11 is a block diagram illustrating an outline of a process performed by the general parallel computer system.
Figure 12:
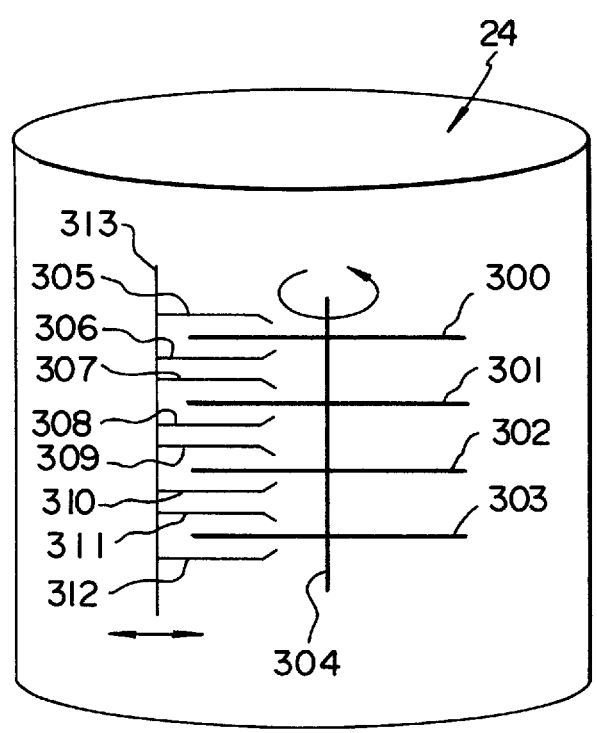
FIG. 12 is a schematic view of a magnetic disk apparatus as a typical secondary storage apparatus.
Figure 13:
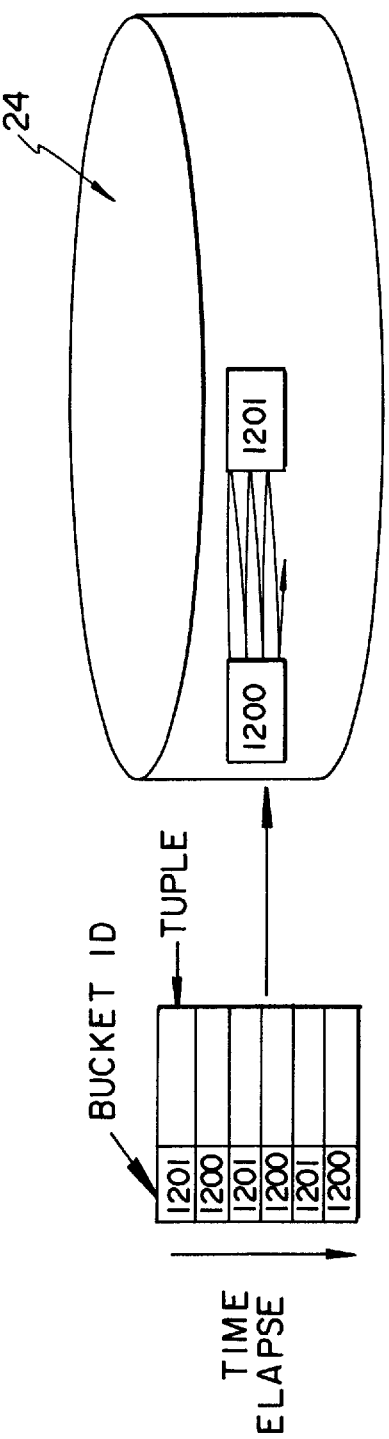
FIG. 13 illustrates an example of a database process whose access efficiency is poor.
Figure 14:
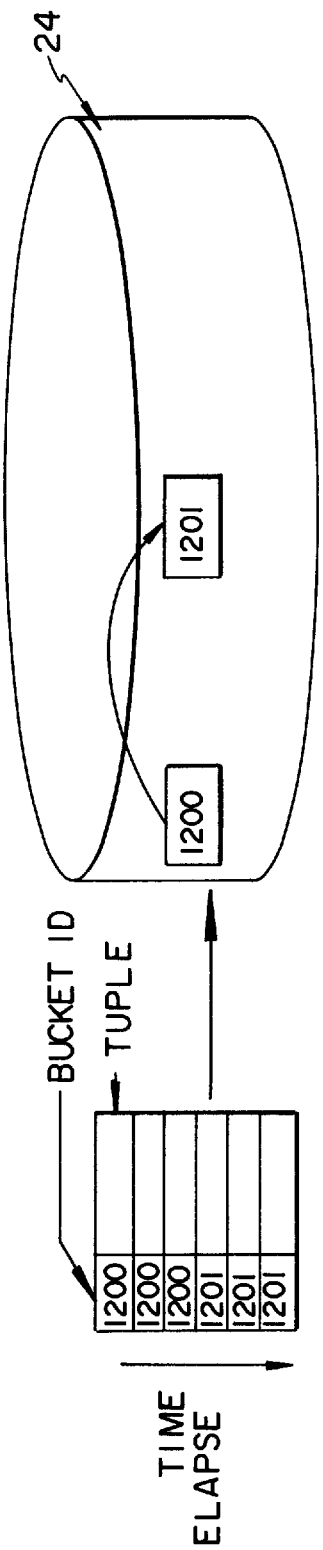
FIG. 14 illustrates an example of a database process whose access efficiency is good.
Figure 15:
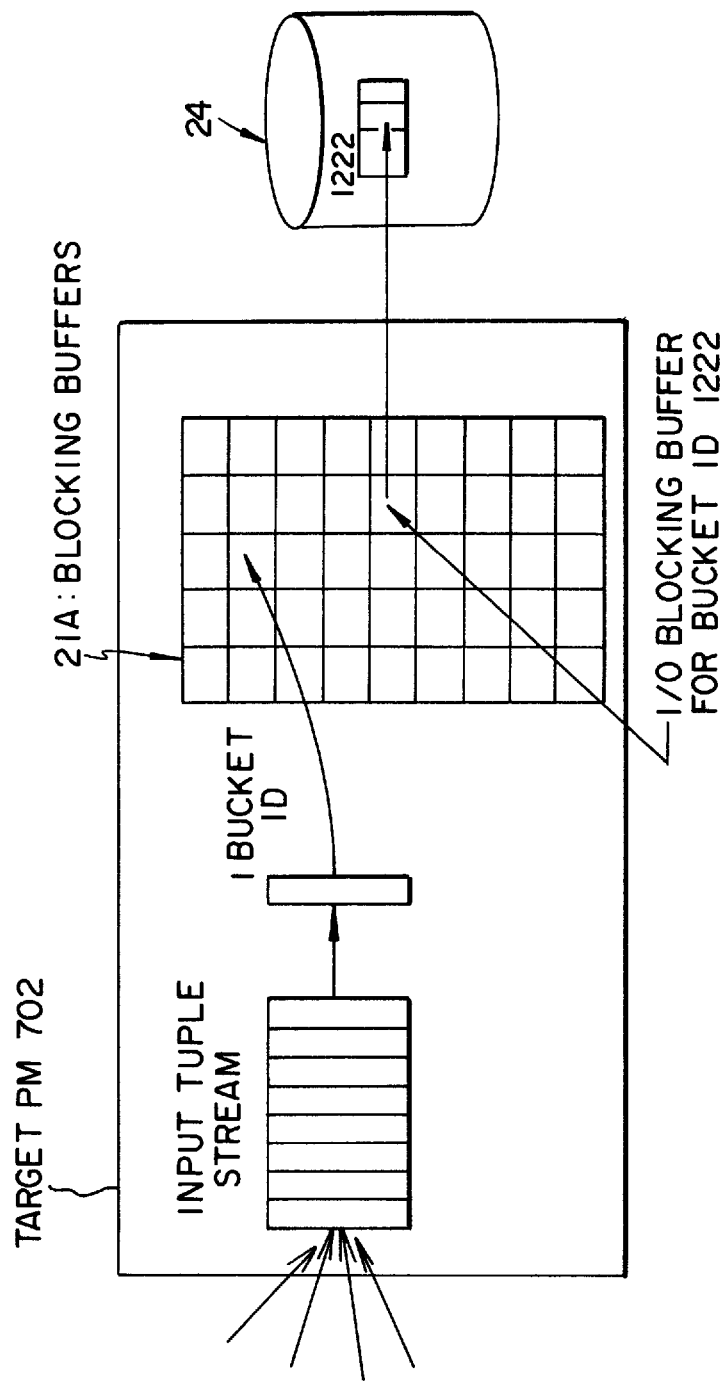
FIG. 15 illustrates an internal structure of a processor module belonging to a second processor group in the general parallel computer system.

At this time, in each of the PMs 1500 through 1502 of this embodiment, I/O blocking buffers 151 are prepared on a storage (a main storage; refer to reference numeral 21 in FIG. 9) correspondingly to respective sorts of the bucket groups. These I/O blocking buffers 151 prepared are in such number that the I/O blocking buffers 151 can receive tuples from the transmitter side PM group 60 and can write the tuples into their own secondary storage apparatus 24, concurrently and in parallel. A size of each of the I/O blocking buffers 151 is so set as to satisfy the demand in terms of an assurance of a capacity of the above I/O access unit.

Based on the above recognition as to which bucket group the tuple inputted into each of the PMs 1500 through 1502 belongs to, the tuple is stored in any of the I/O blocking buffers 151 corresponding to the recognized bucket group.

If a quantity of tuples stored in a certain blocking buffer 151 through the above tuple storing work gets to satisfy the demand for assuring a capacity in terms of the above I/O access unit, tuples stored in that I/O blocking buffer 151 are collectively stored in its own secondary storage apparatus 24. Whereby, data that is an object of the process is stored in each of the secondary storage apparatus 24 of the intermediate blocking PM group 150 in a state where the data is divided into bucket groups 910-1 through 910-m of m sorts.

As the second step (a processing operation by means of a function as the second dividing unit 6 described above with reference to FIG. 1), each of the bucket groups is read out from the intermediate blocking PM group 150, sent to the receiver side PM group 70, and stored in the secondary storage apparatus 24 in a state where the data is again divided into individual buckets (whose total number is m·n) 920-1 through 920-m·n in the receiver side PM group 70.

Description will be next made of a process by the intermediate blocking PM group 150 at the second step. First, the PM group 150 and the receiver side PM group 70 simultaneously recognize all together a start of the second step by means of an arbitrary macroscopic synchronizing mechanism (now shown in FIG. 2). Here, the term "macroscopic" means that there is no necessity of precise synchronization in a clock level but a means of realizing synchronization in a degree of message passing is sufficient, in other words, a minute offset in time can be allowed. The above synchronizing mechanism may be realized by that the intermediate blocking PM group 150 communicates with the receiver side PM group 70 to establish a synchronization, or may be provided separately as a means of macroscopically controlling all the PMs.

The receiver side PM group 70 and the intermediate blocking PM group 150 recognize as to which bucket group should be an object of the process by being directed by the above synchronizing mechanism or a similar mechanism provided separately therefrom, or according to a law given in advance as a rule. This recognition should be had by all the PMs belonging to the receiver side PM group 70 and the intermediate blocking PM group 150, at substantially the same time in a macroscopic sense (in prior to an actual data transfer), as well.

Each of the PMs 1500 through 1502 belonging to the intermediate blocking PM group 150 reads a tuple group from a bucket group that is an object of the process from its own secondary storage apparatus 24, and sends the tuples to the receiver side PM group 70 according to an arbitrary distribution theory. Here, description will be made on an assumption that a leveling of loads on the PMs is not positively realized. It is, therefore, not particularly designated whether a control depending on a bucket identifier is implemented in the intermediate blocking PM group 150 or in the receiver side PM group 70.

If a sending of a certain bucket group is completed, the intermediate blocking PM group 150 and the receiver side PM group 70 initiate a process on the next bucket group at a point of time that the above synchronizing mechanism or a similar mechanism recognizes that all the PMs belonging to the intermediate blocking PM group 150 and the receiver side PM group 70 complete transmission and reception of the bucket group.

Next description will be made of a process by the receiver side PM group 70 at the second step. Each of the PMs 700 through 702 belonging to the receiver side PM group 70 recognizes a start/finish of the entire process at the second step and the process on each of the bucket group at substantially the same time in a macroscopic sense together with the intermediate blocking PM group 150.

In prior to initiating reception of the bucket group, I/O blocking buffers 71 are prepared on a storage (a main storage; refer to reference numeral 21 in FIG. 9) correspondingly to respective sorts of the buckets included in each of the bucket groups in each of the PMs 700 through 702 belonging to the receiver side PM group 70 of this embodiment. The number of these I/O blocking buffers 71 prepared is sufficient to "execute a tuple reception from the intermediate blocking PM group 150 and a write into the secondary storage apparatus 24 concurrently and in parallel", correspondingly to the number of buckets included in a bucket group processed next. A size of each of the I/O blocking buffers 71 is so set as to satisfy the demand for assuring a capacity in terms of the above I/O access unit.

When receiving a tuple included in a bucket group that is an object of the process from the intermediate blocking PM group 150, each of the PMs 700 through 702 applies a grouping function to the tuple if a bucket identifier is not added to the received tuple to determine the bucket identifier for a bucket to which the tuple belongs to.

Each of the PMs 700 through 702 stores the tuple in an I/O blocking buffer 71 corresponding to the bucket to which the tuple belongs to on the basis of the determined bucket identifier.

If a quantity of tuples stored in a certain I/O blocking buffer 71 reaches a quantity satisfying the demand for assuring a capacity in terms of the above I/O access unit through the above tuple storing work, tuples stored in that I/O blocking buffer 71 are collectively stored in its own secondary storage apparatus 24. Whereby, tuples of n sorts (buckets of n sorts) included in each of the bucket groups 910-1 through 910-m are stored in each of the secondary storage apparatus 24 of the receiver side PM group 70 in a state where the tuples are divided according to the sort.

According to this embodiment, leveling of loads on the PMs (a function of the first load leveling unit and the second load leveling unit described above) prevents a decrease of a throughput in the entire apparatus due to concentration of a load on a particular PM in the system described with reference to FIG. 2.

Namely, at the first step described above, each of the PMs 600 through 602 belonging to the transmitter side PM group 60 applies a grouping function to a tuple read out from its own secondary storage apparatus 24 to recognize as to which bucket group among bucket groups of m sorts the tuple belongs to.

Each of the PMs 600 through 602 belonging to the transmitter side PM group 60 has a mechanism (the first load leveling unit; not shown in FIG. 2) for controlling so that approximately the same quantity of tuples belonging to each of the bucket groups of m sorts is transferred to every PMs 1500 through 1502 belonging to the intermediate blocking PM group 150 (uniformly or approximately uniformly) at the first step described above. This mechanism can be realized with a round robin pointer or a table which is addressable with each of buckets and an interblocking PM identifier and accumulates a quantity of data that should be sent to each of the intermediate blocking PMs 1500 through 1502, for example. With use of such mechanism, it is possible to send tuple data in substantially the same quantity belonging to the same bucket group from the transmitter side PMs 600 through 602 to any of the intermediate blocking PMs 1500 through 1502.

Further, each of the PMs 1500 through 1502 belonging to the intermediate blocking PM group 150 has a mechanism (the second load leveling unit; not shown in FIG. 2) for controlling so that approximately the same quantity of tuples belonging to each of the buckets of n sorts included in each of the bucket groups to be transferred (uniformly or approximately uniformly) to any of the PMs 700 through 702 belonging to the receiver side PM group 70 using a bucket identifier of the tuple read out from its own secondary storage apparatus 24 at the second step described above. This mechanism can be accomplished with a round robin pointer, or a table which is addressable with each bucket and a receiver side PM identifier and accumulates a quantity of data that should be sent to each of the receiver side PMs 700 through 702, for example. With use of such mechanism, it is possible to send approximately the same quantity of tuple data belonging to the same bucket from the intermediate blocking PMs 1500 through 1502 to any of the receiver side PMs 700 through 702. Incidentally, if in each of the PMs 1500 through 1502 a bucket identifier is not added to a tuple read out from its own secondary storage apparatus 24, a grouping function is once again applied to the tuple to obtain a bucket identifier.

Referring next to FIG. 2, description will be made of a scheme of the parallel processor apparatus of this invention.

As stated above, the number of buckets obtained by applying a grouping function to a given database table becomes, in general, quite large if each of the buckets is expected to be in size in a degree sufficient to be retained on the main storage. This causes difficulty of satisfying a requirement for assuring a capacity in terms of the I/O access unit as to every sorts of buckets simultaneously.

In this invention, an attention is paid to that it is not so difficult to prepare I/O blocking buffers in number equal to, for example, the number of roots of the number of sorts of the buckets although it is difficult to prepare the I/O blocking buffers in number equal to the number of sorts of the buckets. A gist of this invention is to implement a grouping (a dividing process) in at least two stages since the grouping in at least two stages allows a sufficiently high-speed process as compared with a case where the requirement for assuring a capacity in terms of the above I/O access unit is not satisfied (an entire performance is reduced largely since read/write is reduced below one-fifth) although the throughput is as half as an ideal speed.

At the first step described above, a range of bucket identifiers is exclusively divided into m, and tuples are classified into m sorts with the bucket identifiers. The m sets of tuples generated in this division are called bucket groups. Inside each of the bucket groups, plural buckets (of n sorts here) are stored at random regardless of the order of generating the bucket in a level of tuples.

At the second step described above, the same bucket group, that is, a region including 1/m buckets in average of the original table, is read out and divided into buckets in the similar manner while all the PMs 1500 through 1502 storing each of the bucket groups therein are macroscopically in synchronism with each other.

If the original table includes n·m buckets, only n buckets in average appear at the second step. If the I/O blocking buffers 71 in number which can completely divide the number n of the buckets are available at the second step, a fully bucket division is feasible.

Assuming that m≈n since a ratio of a database capacity to a main storage capacity is generally in an order of about $10^3$ through $10^4$, m≈n≦$10^2$. If several hundreds KB is a practically required value for assuring a capacitance of the I/O access unit, the I/O blocking buffers 71 and 151 can be prepared within a range of several MB through several tens MB, i,e., a range of a capacity of the main storage.

As a developed modification of this invention, it is possible to configure the intermediate blocking PM group 150 in plural stages and root the number of buckets plural times so as to be able to cope with an extremely large number of buckets. Note that since the performance is degraded each time the stage is added, the number of the stages should be determined upon evaluation on a performance gain including the next process.

The description is being made as if the intermediate blocking PM group 150 exists separately from the transmitter side PMs group 60 or the receiver side PM group 70. However, no problem occurs if the intermediate blocking PM group 150 physically coincides with the transmitter side PM group 60 or the receiver side PM group 70, or overlaps on them or is included in them, or all the PM groups 60, 70 and 150 are physically the same set.

Without the load leveling process described above, there is a possibility that a speed of sending data to a particular PM exceeds a performance of a process of the PM including a performance of a secondary storage apparatus writing process of each of the PMs belonging to the receiver side PM group 70 or the intermediate blocking PM group 150 so that an operating performance of the system is degraded. The load leveling process, therefore, prevents occurrence of unbalance of load among the PMs in each of the stages to prevent the above phenomenon.

Referring to FIGS. 3 through 8, the parallel processor apparatus (a parallel computer system) as an embodiment of this invention will be next described in detail.

Figure 3:
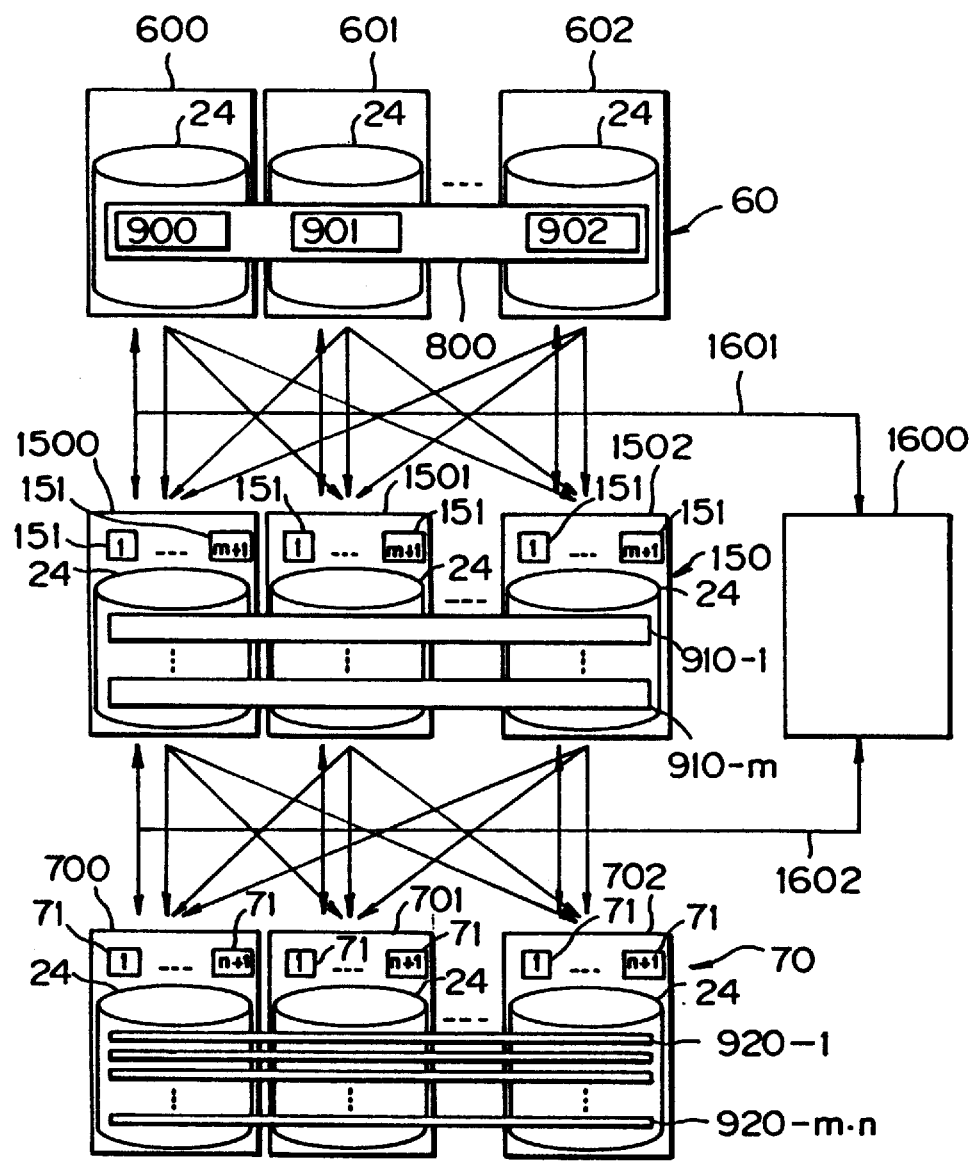
FIG. 3 is a block diagram schematically showing an entire structure of the parallel processor apparatus according to the embodiment of this invention.

FIG. 3 is a block diagram schematically showing an entire structure of the parallel processor apparatus as the embodiment of this invention. As shown in FIG. 3, the parallel processor apparatus has substantially the same structure shown in FIG. 2, excepting that a control PM 1600 is newly added thereto.

The control PM 1600 newly added to the apparatus shown in FIG. 3 exists separately to roughly control macroscopic synchronization of the PMs and processes performed in each of the PMs. The control PM 1600 sends and receives data such as command dispatch, condition report and the like to and from each of the PMs 600 through 602, 700 through 702 and 1500 through 1502 via a communication lines 1601 and 1602 to manage the whole apparatus so as to control the entire process.

According to this embodiment, each of the PMs 1500 through 1502 belonging to the intermediate blocking PM group 150 has m+1 I/O blocking buffers 151. m buffers out of these m+1 buffers 151 are served to store tuple data of bucket groups sent from the previous stage, i.e., the transmitter side PMs 600 through 602. The remaining one is served to send and receive data to and from the secondary storage apparatus 24.

Similarly, each of the PMs 700 through 702 belonging to the receiver side PM group 70 has n+1 I/O blocking buffers 71. n buffers out of the n+1 buffers 71 are served to store tuple data of buckets sent from the previous stage, i.e., the intermediate blocking PMs 1500 through 1502. The remaining one is served to send and receive data to and from the secondary storage apparatus 24.

Incidentally, the above I/O blocking buffers 151 and 71 each has a size sufficient to satisfy the demand for assuring a capacity in terms of the I/O access unit.

With the above structure, the apparatus shown in FIG. 3 operates in the quite same manner as the apparatus shown in FIG. 2 while being controlled by the control PM 1600.

Figure 4:
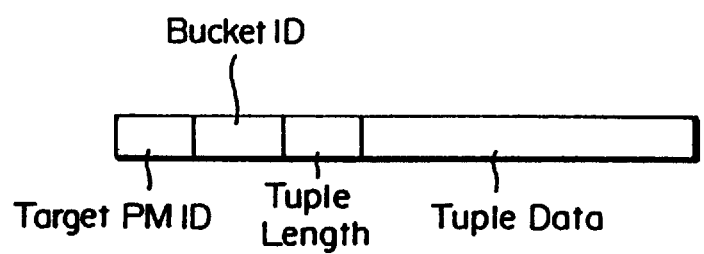
FIG. 4 shows a schematic configuration of a packet flowing in a PM network according to the embodiment.

Referring now to FIG. 4, a schematic structure of a packet flowing in a PM network according to this embodiment will be described. If each tuple is transmitted via the PM network, tuple data is stored in a data portion of the packet, and an identifier of a target PM (Target PM ID) in the network, an identifier of a bucket (a Bucket ID; an output value of a grouping function) to which this tuple belongs and a tuple length are added and stored in a header portion of the packet, as shown in FIG. 4.

Figure 5:
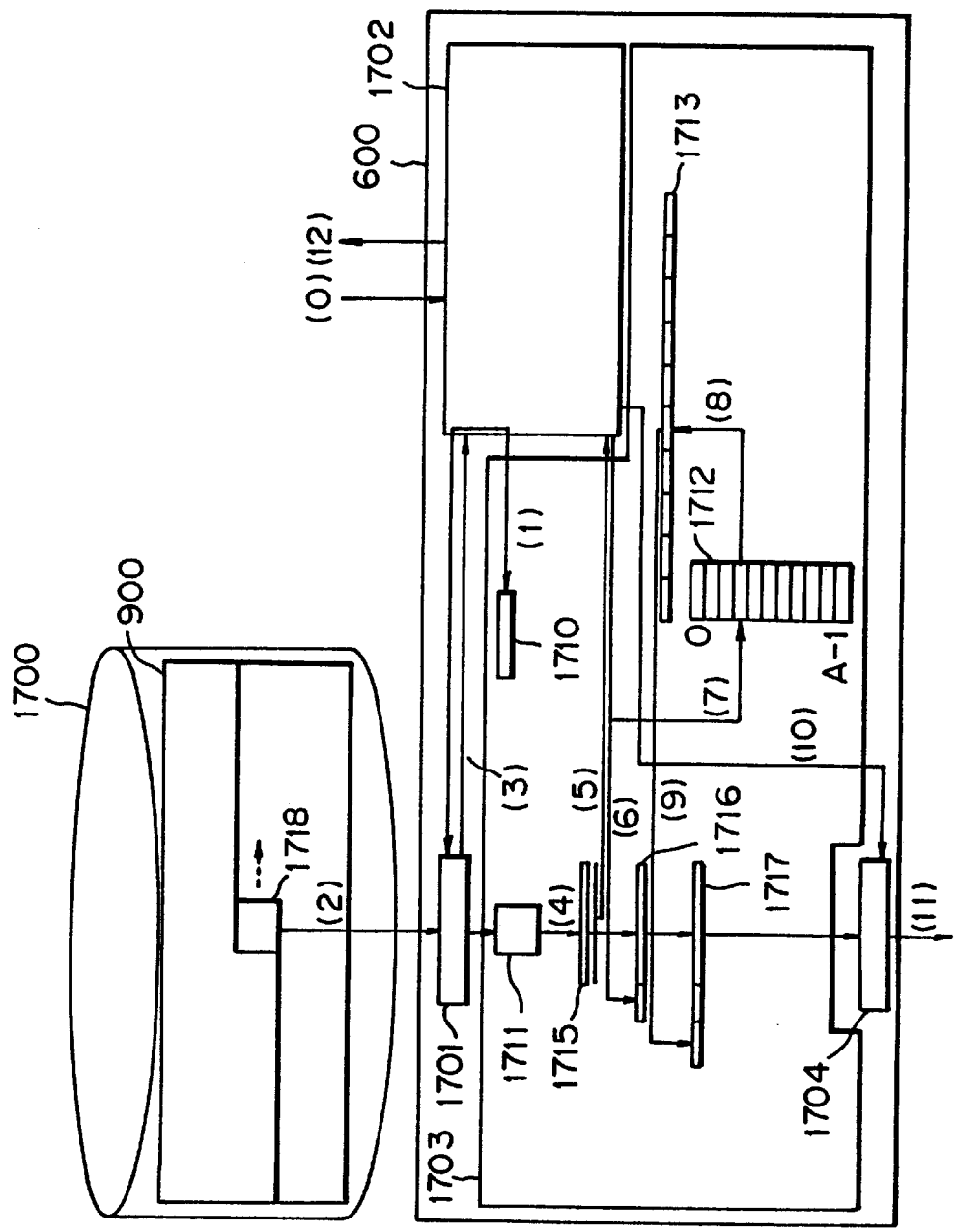
FIG. 5 is a block diagram illustrating an internal structure and an operation of a transmitter side PM at a first step according to the embodiment.

FIG. 5 is a block diagram illustrating an internal structure and an operation of the transmitter side PM 600 at the first step described hereinbefore. In FIG. 5, reference numeral 1700 denotes a secondary storage apparatus (corresponding to the secondary storage apparatus 24 described hereinbefore) connected to the PM 600. The secondary storage apparatus 1700 stores a subset (a subtable) 900 of a table that is an object of the process therein.

In the transmitter side PM 600, an I/O circuit 1701, a CPU circuit 1702, a main storage 1703 and a PM network interface circuit 1704 are incorporated. The I/O circuit 1701 corresponds to the I/O mechanism 23 described hereinbefore with reference to FIG. 9, the CPU circuit 1702 corresponds to the CPU 20 described hereinbefore with reference to FIG. 9, the main storage 1703 corresponds to the storage 21 described hereinbefore with reference to FIG. 9, and the interface circuit 1704 corresponds to the access mechanism 22 described hereinbefore with reference to FIG. 9.

Further, reference numerals 1710 through 1713 and 1715 through 1717 denote regions on the main storage 1703. The region 1710 is a read pointer indicating a read position inside the subtable 900. The read pointer 1710 is realized as a variable on the main storage 1703. The read pointer 1710 indicates a leading position of the subtable 900 immediately after an initialization, and is incremented by a capacity of a buffer 1711, which will be described later, every time an input process is performed from the subtable 900.

Reference numeral 1711 denotes the input buffer for storing data read out in one I/O process, whose size (capacity) is so set as to satisfy the demand for assuring a capacity in terms of the I/O access unit.

Reference numeral 1712 denotes a round robin pointer (the first load leveling unit) showing which intermediate blocking PM 1500, 1501 or 1502 provided correspondingly to each of the bucket group data should be transferred to. If the number of the intermediate blocking PMs 1500 through 1502 is A, a value of the round robin pointer 1712 wraps around 0 through A−1.

Reference numeral 1713 denotes a conversion table used to determine an identifier of each of the practical intermediate blocking PMs 1500 through 1502 on the network from a value of the round robin pointer 1712. An entry number of the conversion table 1713 is equal to the number of the intermediate blocking PMs 1500 through 1502, inside of which individual identifiers of the intermediate blocking PMs 1500 through 1502 on the network are stored.

Reference numeral 1715 denotes data for one tuple extracted from data in the input buffer 1711. Reference numeral 1716 denotes data composed of a bucket identifier obtained by applying a grouping function to the data 1715 for one tuple and the data 1715 for this one tuple coupled to the identifier. Reference numeral 1717 denotes data (a transferred packet) composed of the data 1716 and an identifier of a target PM on the network coupled to the data 1716. The data 1717 satisfies a bucket format shown in FIG. 4.

Reference numeral 1718 denotes a data portion which is being read out from the secondary storage apparatus 1700 into the transmitter side PM 600.

Numerals in parentheses (0) through (12) in FIG. 5 are given correspondingly to a process in the transmitter side PM 600, used when an operation of the transmitter side PM 600 is described. Incidentally, FIG. 5 shows a structure of only the transmitter side PM 600, but it is a matter of course that another transmitter side PMs 601 and 602 have similar structures.

Now, description will be made of an outline of an operation of the transmitter side PM 600 with the above structure at the first step described above. In the description, numerals in parentheses (0) through (12) in FIG. 5 correspond to numerals in parentheses (0) through (12) of items below, respectively.

(0) From the control PM 1600 (refer to FIG. 3) not shown in FIG. 5, a description of a process that should be performed such as an identifier of an objective table, an identifier of a grouping function that should be applied, values of m and A, a list of identifiers of the intermediate blocking PM group 150 and the like is sent to the CPU 1702. An inside control table group in the main storage 1703 is initialized with these data. When the initialization is completed, the CPU 1702 returns this effect as a response to the control PM 1600, then starts a process when receiving an instruction to start the process from the control PM 1600.

(1) The CPU 1702 reads contents of the pointer 1710, generates an input command used to read a data block in size equal to a size of the buffer 1711 from a region indicated by the pointer 1710, and gives the command to the I/O circuit 1701. After that, the CPU 1702 increments a value of the pointer 1710 by only a size of the buffer 1711.

(2) The I/O circuit 1701 reads out data 1718 designated by the CPU 1702 from the secondary storage apparatus 1700 into the inside of the buffer 1711.

(3) The I/O circuit 1701 interrupts to notify completion of the required input process to the CPU 1702.

(4) The CPU 1702 extracts data 1715 for one tuple from the inside of the buffer 1711, and performs the following process (5) through (11) on the data 1715.

(5) The tuple data 1715 is taken into the CPU 1702 and applied a designated grouping function.

(6) A bucket identifier which is a result of the application of the grouping function is coupled to tuple data 1715 (the left portion in FIG. 5).

(7) The bucket identifier, at the same time, becomes an identifier of a bucket group which is designated using a remainder yielded by dividing by an integer m (the number of sorts of the bucket groups). The CPU 1702 obtains the identifier of the bucket group to which the tuple data 1715 belongs to specify the round robin pointer 1712 (a value corresponding to this bucket group) used to determine a transmission target.

(8) According to a pointer value designated by the round robin pointer 1712, the conversion table 1713 used to convert the pointer value into a PM identifier is indexed to obtain target information, that is, an identifier of an intermediate blocking PM that should receive this tuple data 1715. At this time, contents of the pointer (one entry in 1712) are incremented by one, after that, a value of a remainder yielded by dividing by the number of the intermediate blocking PMs is once again substituted therein.

(9) The obtained target information is connected to the data 1716 (the left portion in FIG. 5) of [tuple data+bucket identifier], and a transferred packet 1717 is generated on the main storage apparatus 1703.

(10) The CPU 1702 shows a leading address within the main storage in the storing region for the transferred packet 1717 to the interface circuit 1704, and directs the interface circuit 1704 to send the packet 1717 thereto.

(11) The transferred packet (tuple data) 1717 is instantaneously sent out to the network by the interface circuit 1704 (in synchronism with the CPU 1702). In this embodiment, a protocol on the network is simplified so that the CPU 1702 does not submit a response such as a visible ACK (Acknowledge) signal.

(12) Until the above process is performed on all data in the subtable 900 in the secondary storage apparatus 1700, the procedure returns to the process in the above item (1). If the CPU 1702 judges that the process on all data is completed, the CPU 1702 releases an internal resource, and reports the completion of the process to the control PM 1600.

Figure 6:
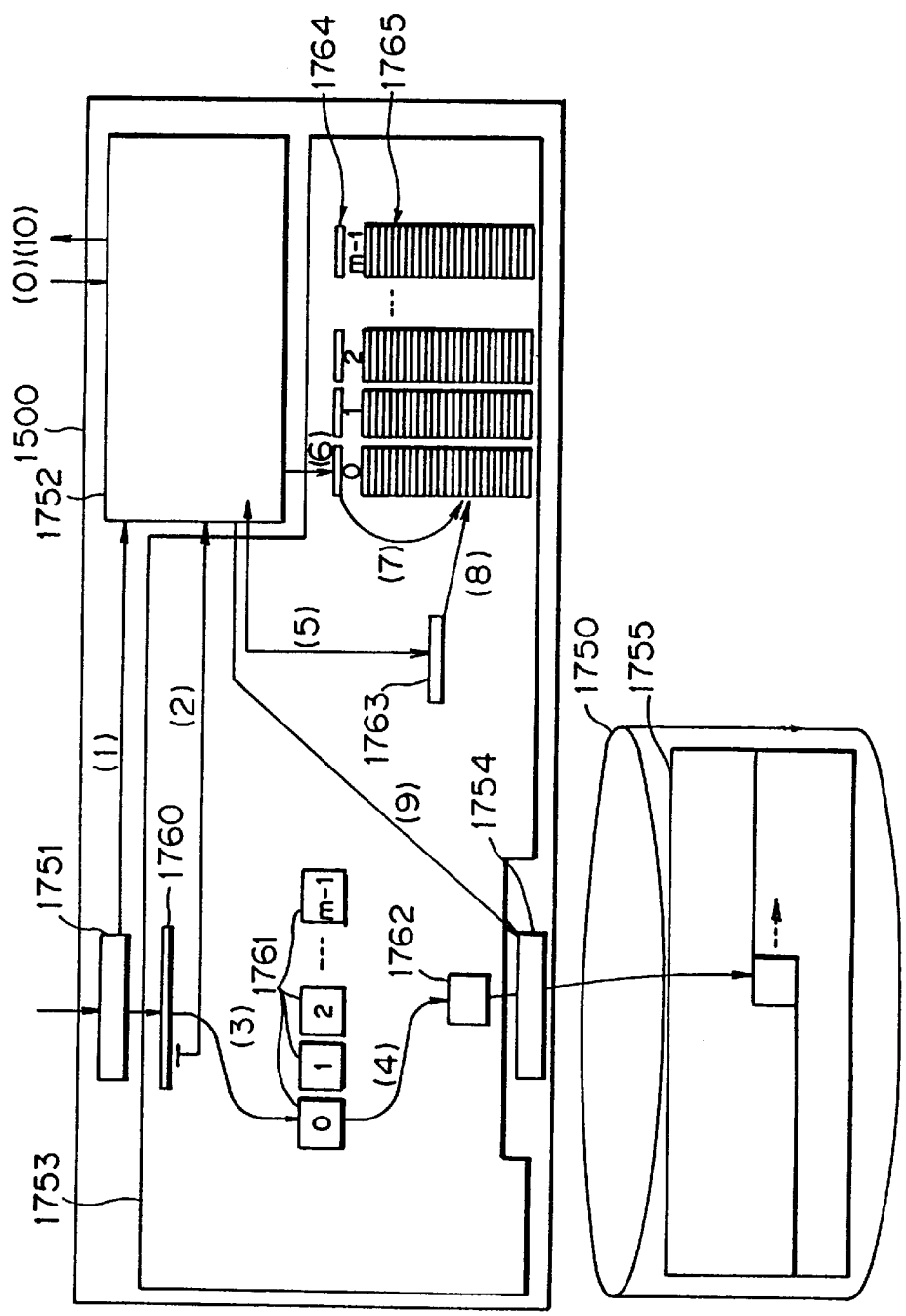
FIG. 6 is a block diagram illustrating an internal structure and an operation of an intermediate blocking PM at the first step according to the embodiment.

FIG. 6 is a block diagram illustrating an internal structure and an operation of the intermediate blocking PM 1500 at the first step described above. In FIG. 6, reference numeral 1750 denotes a secondary storage apparatus (corresponding to the secondary storage apparatus 24 described hereinbefore) connected to the PM 1500. The secondary storage apparatus 1750 has, as will be described later, a region therein, which is served to store a subset 1755 of m sorts of the bucket groups 910-1 through 910-m (refer to FIG. 3) received from the transmitter side PM 600 (or 601 or 602).

In the intermediate blocking PM 1500, a PM network interface circuit 1751, a CPU circuit 1752, a main storage 1753 and an I/O circuit 1754 are incorporated. Here, the interface circuit 1751 corresponds to the access mechanism 22 described hereinbefore with reference to FIG. 9, the CPU circuit 1752 corresponds to the CPU 20 described hereinbefore with reference to FIG. 9, the main storage 1753 corresponds to the storage 21 described hereinbefore with reference to FIG. 9, and the I/O circuit 1754 corresponds to the I/O mechanism 23 described hereinbefore with reference to FIG. 9.

Further, reference numerals 1760 through 1765 denote regions on the main storage 1753. Reference numeral 1760 denotes a region served to temporarily store therein tuple data sent from any one of the transmitter side PMs 600 through 602 in a data transfer between the PMs. Reference numeral 1761 denotes m sorts of I/O blocking buffers (0 through m−1; corresponding to the I/O blocking buffers 151, respectively, shown in FIGS. 2 and 3). Each of the I/O blocking buffers 1761 has a size sufficient to satisfy the demand for assuring a capacity of the I/O access unit demanded by the secondary storage apparatus 1750, as stated before, corresponding to each of the sorts of the bucket groups one to one.

Reference numeral 1762 denotes an input-output buffer (an I/O buffer) served to temporarily store therein data that should be outputted to the I/O circuit 1754 or data inputted from the I/O circuit 1754. Reference numeral 1763 denotes a write pointer into the region 1765. The write pointer 1763 is incremented by only a size of the buffer 1762 every time an input-output process on the region 1765 is completed.

Reference numeral 1764 denotes a write pointer to a region 1765 in which a position in a file (an address) written each of bucket groups therein is stored. The write pointer 1764 and the region 1765 make a pair one to one, provided correspondingly to each sort of the bucket groups.

Incidentally, numerals in parentheses (0) through (10) in FIG. 6 are given correspondingly to a process in the intermediate blocking PM 1500, respectively, used when an operation of the intermediate blocking PM 1500 is described. FIG. 6 shows only a structure of the intermediate blocking PM 1500, but it is a matter of course that another intermediate blocking PMs 1501 and 1502 have similar structures.

Description will be now made of an outline of an operation of the intermediate blocking PM 1500 with the above structure at the first step described above. In the following description, numerals in parentheses (0) through (10) in FIG. 6 correspond to numerals in parentheses (0) through (10) of items below, respectively.

(0) From a control PM 1600 (refer to FIG. 3) not shown in FIG. 6, a description of a process that should be performed such as an identifier of an objective table, a width of a range of bucket identifiers, a value of m, an estimated value of a quantity of transferred data, a list of the transmitter side PM group 60 that should be in communication and the like are sent. The CPU 1752 thereby initializes a control table in the main storage 1753. When completing the initialization, the CPU 1752 sends this effect as a response to the control PM 1600, after that, starts the process when receiving an instruction to start the process from the control PM 1600. Incidentally, as an example of the initialization, all entries of the region 1765 are set to an invalid value (a negative value, for example) and all values of the write pointer 1764 are set to zero.

(1) When receiving a tuple, the network interface circuit 1751 interrupts to transmit it to the CPU 1752. The CPU 1752 instructs to take the tuple into the region 1760 by notifying a leading address of the region 1760.

(2) The CPU 1752 refers a bucket identifier field within the tuple, and a result (a remainder) of an integer residue operation with an integer m is recognized as an identifier of a bucket group of this tuple.

(3) According to this bucket group identifier, the tuple (bucket identifier+tuple length+tuple data portion, exactly speaking) is stored in the I/O blocking buffer 1761 corresponding to the sort of the bucket group. If a quantity of data stored in the I/O blocking buffer 1761 does not satisfy the demand for assuring a capacity in terms of the I/O access unit demanded by the secondary storage apparatus 1750 in this storing process, the procedure jumps to the item (10), which will be described later.

(4) If an accumulated quantity of the data in the I/O blocking buffer 1761 satisfies the demand in terms of assurance of the capacity of the I/O access unit demanded by the secondary storage apparatus 1750, contents of the buffer 1761 are transferred to the I/O buffer 1762, and cleared after that.

(5) The CPU 1752 takes into contents at a value of the write pointer 1763 to obtain a write position. After that, the contents of the pointer 1763 are incremented by only a size of the I/O buffer 1762.

(6) The CPU 1752 selects a pair of the write pointer 1764 and the region 1765 corresponding to a bucket group that is an object of discharge.

(7) With the pair of the write pointer 1764 and the region 1765 selected in the process in the above item (6), an entry of the region 1765 indicated by the write pointer 1764 is selected. After that, contents of the write pointer 1764 are incremented by only one entry.

(8) The write position obtained in the above item (5) is written in the entry of the region 1765 selected in the process in the above item (7).

(9) The CPU 1752 generates an input-output command used to store contents of the I/O buffer 1762 into the write position (a position in the secondary storage apparatus 1750) obtained in the process in the above item (5), and sends the command to the I/O circuit 1754.

(10) The CPU 1752 stands by until a termination signal from the control PM 1600, or an interruption signal representing an arrival of a new tuple from the network interface circuit 1751 arrives. If receiving a termination signal from the control PM 1600, the CPU 1752 performs a process in the above item (4) and forward on every buffer not vacant among the buffers 1761, releases internal control information excepting the write pointer 1764 and the region 1765 after that, and sends back a process termination report to the control PM 1600.

Figure 7:
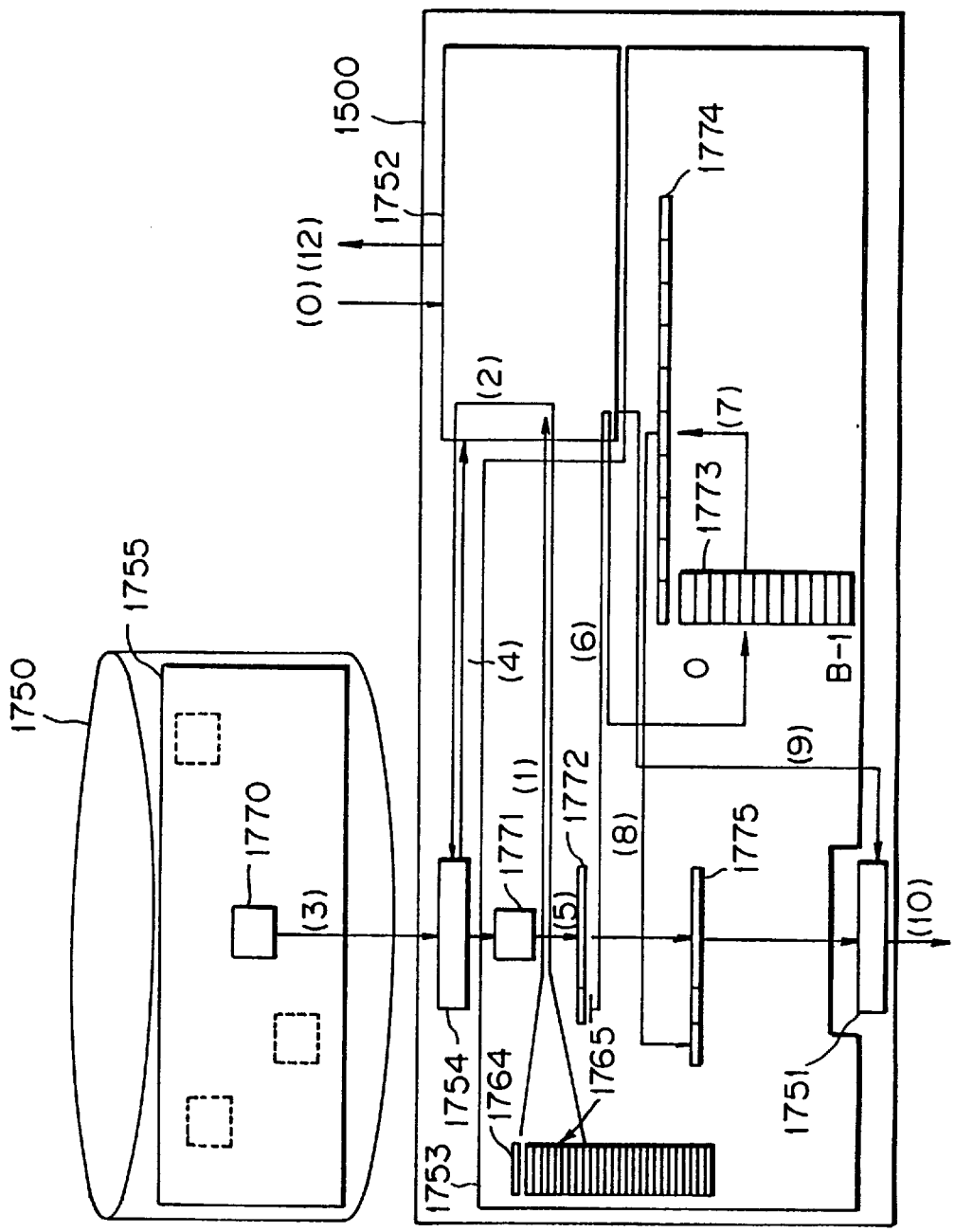
FIG. 7 is a block diagram illustrating an internal structure and an operation of the intermediate blocking PM at a second step according to the embodiment.

FIG. 7 is a block diagram illustrating an internal structure and an operation of the intermediate blocking PM 1500 at the second step described above. In FIG. 7, like reference characters designate, basically, like or corresponding parts in FIG. 6, descriptions of which are thus omitted here.

In a condition shown in FIG. 7, a secondary storage apparatus 1750 connected to the PM 1500 has, therein, a region in which data [a sum of sets of m sorts of bucket groups 910-1 through 910-m (refer to FIG. 3)] received in the above first step is stored, as will be described later.

In a region 1765 on a main storage 1753, information describing a storing address (a write position) in the secondary storage apparatus 1750 of each of bucket groups generated at the above first step is stored. Further, each of write pointers 1764 functions as a counter used to sequentially access to a description as to each I/O access unit in the information of each region 1765 to easily generate an address of each entry in the corresponding region 1765 from contents of each of the pointers 1764 when a process at the second step is performed.

Reference numeral 1770 denotes a data block of data 1775 within the secondary storage apparatus 1750. The data block 1770 stores only data belonging to a certain bucket group, which is now an object of the process in the condition shown in FIG. 7.

Reference numerals 1771 through 1775 denote regions on a main storage 1753. Reference numeral 1771 denotes an I/O buffer (an input-output buffer) for temporarily storing data read out from the secondary storage apparatus 1750 therein. Reference numeral 1772 denotes a region in which tuple data (data composed of tuple data and a bucket identifier of a bucket to which this tuple belongs coupled to the data, exactly speaking) extracted from the I/O buffer 1771 is temporarily stored.

Reference numeral 1773 denotes a round robin pointer (the second load leveling unit) representing which receiver side PM 700, 701 or 702 provided correspondingly to each bucket group the data should be transferred to. If the number of the receiver side PMs 700 through 702 is B, a value of the round robin pointer 1773 wraps around 0 through B−1.

Reference numeral 1774 denotes a conversion table used to determine practical identifier on the network of each of the receiver side PMs 700 through 702 from a value of the round robin pointer 1773. The number of entries of the conversion table is in equal to the number of the receiver side PMs 700 through 702, inside of which identifiers on the network of the individual receiver side PMs 700 through 702 are stored.

Reference numeral 1775 denotes a region in which bucket data that should be sent to the network is temporarily stored. From the region 1775, the interface circuit 1751 reads out data composed of data stored in the region 1772 and an identifier on the network of a target receiver side PM coupled to the data (i.e., data satisfying the packet format shown in FIG. 4) according to an instruction from a CPU 1752, and sends out the data to the network.

Incidentally, numeral in parentheses (0) through (12) in FIG. 7 are given correspondingly to a process in the intermediate blocking PM 1500, respectively, used when an operation of the intermediate blocking PM 1500 is described. FIG. 7 shows only a structure of the intermediate blocking PM 1500, but it is a matter of course that another intermediate blocking PMs 1501 and 1502 have similar structures.

Now, description will be made of an outline of an operation of the intermediate blocking PM 1500 with the above structure at the above second step. In the description, the numbers in parentheses (0) through (12) in FIG. 7 correspond to numbers in parentheses (0) through (12) of items below, respectively.

(0) A description of a process that should be performed such as an identifier of the region 1775 that is an object of the process, values of n and B, a list of identifiers of the receiver side PM group 70 and the like are sent from a control PM 1600 (refer to FIG. 3) not shown in FIG. 7 to the CPU 1752. An internal control table group in the main storage 1753 is initialized with these data. When the initialization is completed, the CPU 1752 sends back this effect as a response to the control PM 1600, then starts the process when receiving an instruction to start the process from the control PM 1600. The practical process completes for each bucket group. More specifically, the control PM 1600 sets any of the number 0 through m−1 in the instruction to designate which bucket group should be an object of the process so as to start the process.

(1) The CPU 1752 selects a pair of the counter 1764 describing a storing region of a bucket group corresponding to the number (any one of 0 through m−1) included in the instruction from the control PM 1600 and the region 1765. Here, assuming that termination of a reading of a bucket group can be judged by reading an invalid entry of the region 1765. The CPU 1752 initializes a value of the selected counter 1764 to zero.

(2) The CPU 1752 obtains an address of an entry in the region 1765 in accordance with a value of the counter 1764 corresponding to the bucket group that is now an oabject of the process. In the region 1765, a value of the next storing region of data of that bucket group in the region 1755 of the second storage apparatus 1750 is stored. And then, the CPU 1752 gets an access to this entry to obtain an address of a storing region which is contents of it. After that, a value of the counter 1764 is incremented by one entry. Incidentally, if a value of an entry in the region 1765 read out is invalid (a negative value, for example), it is considered that the process on this bucket group is completed, and the procedure jumps to the item (12) below. The CPU 1752 generates an input-output command used to read out data for one block from a region of the secondary storage apparatus 1750 into the input buffer 1771 using a storing address inside the secondary storage apparatus 1750 read out from an entry of the selected region 1765, and notifies the command to the I/O circuit 1754 to make the I/O circuit 1754 start an I/O process. A size of one block described above is the same as a size used for data storing at the first step, which satisfies the demand for assuring a capacity of the I/O access unit demanded by the secondary storage apparatus 1750.

(3) The I/O circuit 1754 reads out data block 1770 designated by the CPU 1702 from the secondary storage apparatus 1750 into an inside of the buffer 1771.

(4) The I/O circuit 1754 interrupts to notify that the the demanded input process is completed to the CPU 1752.

(5) The CPU 1752 extracts data for one tuple (data composed of tuple data and a bucket identifier coupled thereto) from an inside of the buffer 1771, and performs a process (6) through (10) described below on the data 1772. This process is performed on all tuples inside the buffer 1771.

(6) The bucket identifier coupled to the tuple data 1772 is taken into the CPU 1752. The CPU 1752 specifies one entry of the round robin pointer 1773 corresponding to that bucket identifier.

(7) According to a pointer value designated by the round robin pointer 1773, the conversion table 1713 used to convert the pointer value into a PM identifier is indexed to obtain target information, that is, an identifier of a receiver side PM that should receive this tuple data 1772. At this time, contents of the pointer (one entry in 1773) are incre- mented by only one, after that a result of an integer residue operation with the number of receiver side PMs is once again substituted therein.

(8) The obtained target information is connected to the data 1772 of [tuple data+bucket identifier] (the left portion in FIG. 7), thereby generating a transferred packet 1775 on the main storage 1703.

(9) The CPU 1752 shows a leading address in the main storage in the storing region of the transferred packet 1775 to the interface circuit 1751 to direct the interface circuit 1751 to send it.

(10) The transferred packet (tuple data) 1775 is sent out instantaneously (in synchronization with the CPU 1752) to the network by the interface circuit 1751. According to this embodiment, a protocol on the network is simplified, thus the CPU 1752 gives no response as a visible ACK (Acknowledge) signal, as having been described in relation to the operation of the transmitter side PM 600 at the first step.

(11) The procedure returns to the above item (2).

(12) When completion of the process on all data of a certain bucket group is detected, the CPU 1752 reports this effect to the control PM 1600, and waits an instruction from the control PM 1600. If an instruction from the control PM 1600 is an instruction to terminate the process, the CPU 1752 releases all work regions to terminate the process. If an instruction from the control PM 1600 is an instruction to start a process in terms of the next bucket group (the instruction including an identifier of the bucket group therein) [same as the latter half on the process in the above item (0)], the CPU 1752 starts again the process in the above item (1) and after.

Figure 8:
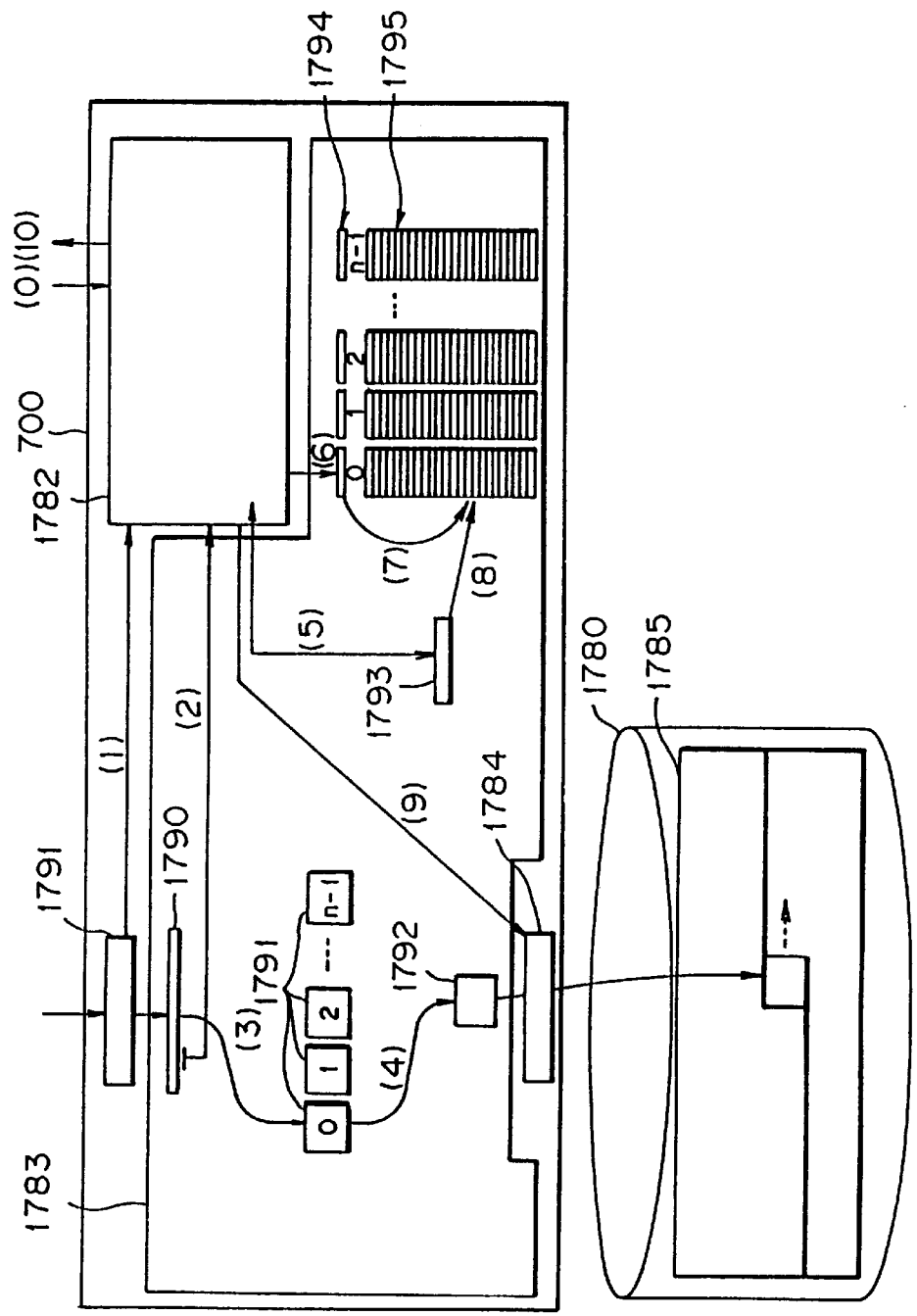
FIG. 8 is a block diagram illustrating an internal structure and an operation of a receiver side PM at the second step according to the embodiment.

FIG. 8 is a block diagram illustrating an internal structure and an operation of the receiver side PM 700 at the second step described above. In FIG. 8, reference numeral 1780 denotes a secondary storage apparatus (corresponding to the secondary storage apparatus 24 described hereinbefore) connected to the PM 700. The secondary storage apparatus 1780 has a region in which a subset of a sum of sets of data [buckets 920-1 through 920-m·n (refer to FIG. 3)] received at the second step is stored, as will be described later.

In the receiver side PM 700, a PM network interface circuit 1781, a CPU circuit 1782, a main storage 1783 and an I/O circuit 1784 are incorporated. Here, the interface circuit 1781 corresponds to the access mechanism 22 described before with reference to FIG. 9, the CPU circuit 1782 corresponds to the CPU 20 described before with reference to FIG. 9, the main storage 1783 corresponds to the storage 21 described before with reference to FIG. 9, and the I/O circuit 1784 corresponds to the I/O mechanism 23 described before with reference to FIG. 9.

Further, reference numerals 1790 through 1795 denote regions on the main storage 1783. Reference numeral 1795 is a region in which information describing a storing address of each bucket in the secondary storage apparatus 1780 generated in the process at the second step is stored. Reference numeral 1794 denotes a counter used to sequentially access to a description as to each I/O access unit in the information in each of the region 1795, which can readily generate an address of each entry within a corresponding region 1795 from contents of each pointer 1794.

Reference numeral 1790 denotes a receiving buffer served to temporarily store data received from the intermediate blocking PM group 150 by the interface circuit 1781 therein. Reference numeral 1791 denotes n sorts of I/O blocking buffers (0 through n−1; corresponding to the I/O blocking buffers, respectively, shown in FIGS. 2 and 3). Each of the I/O blocking buffers 1791 has a size satisfying the demand for assuring a capacity of the I/O access unit demanded by the secondary storage apparatus 1780 as stated before, corresponding to a sort of a bucket one to one.

Reference numeral 1792 denotes an input-output buffer (an I/O buffer) for temporarily storing data that should be outputted to the I/O circuit 1784 or data inputted from the I/O circuit 1784 therein. Reference numeral 1793 denotes a write pointer into the region 1795. The write pointer 1793 is incremented by only a size of the buffer 1792 every time an input-output process on the region 1795 is completed.

The counter 1794 described above also functions as a write pointer to the region 1795 in which a position (an address) inside a file in which each of bucket groups is written is stored. The write pointer (counter) 1794 and the region 1795 make a pair one to one, provided correspondingly to each of sorts of the buckets.

Numbers in parentheses (0) through (9) in FIG. 8 are given correspondingly to a process in the receiver side PM 700, used when an operation of the receiver side PM 700 is described. FIG. 8 shows a structure of only the receiver side PM 700, but it is a matter of course that another receiver side PMs 701 and 702 have similar structures.

Now, description will be made of an outline of an operation of the receiver side PM 700 with the above structure at the above second step. In the description, the numerals in parentheses (0) through (9) in FIG. 8 correspond to the numbers in parentheses (0) through (9) of items below, respectively.

(0) From a control PM 1600 (refer to FIG. 3) not shown in FIG. 8, a description of a process such as an identifier of an objective table, a width of a range of bucket identifiers, a value of n, an estimated value of a quantity of transferred data, a list of intermediate blocking PM group 150 that should be in communication and the like are sent. The CPU 1782 thereby initializes a control table in the main storage 1783. When finishing the initialization, the CPU 1782 sends this effect as a response to the control PM 1600, after that, starts the process when receiving an instruction to start the process from the control PM 1600. Incidentally, as an example of the initialization, all entries of the region 1795 are set to an invalid value (a negative value, for example) and all values of the write pointer (counter) 1794 are set to zero.

(1) When receiving a tuple, the network interface circuit 1781 interrupts to transmit it to the CPU 1782. The CPU 1782 instructs to take the tuple into the region 1790 by notifying a leading address of the region 1790.

(2) A bucket identifier field in the tuple is referred by the CPU 1782, whereby the CPU 1782 recognizes which bucket this tuple should belong to.

(3) With this bucket identifier, only a portion of the tuple data is extracted from data stored in the region 1790. The portion of the tuple data is stored in the I/O blocking buffer 1791 corresponding to the sort of the bucket. If a quantity of data stored in the I/O blocking buffer 1791 in this storing process does not satisfy the demand for assuring a capacity of the I/O access unit demanded by the secondary storage apparatus 1780, the procedure jumps to the item (9), which will be described later.

(4) If a quantity of data stored in the I/O blocking buffer 1791 satisfies the demand for assuring a capacity of the I/O access unit demanded by the secondary storage apparatus 1780, contents of the buffer 1791 are transferred to the I/O buffer 1792, then cleared.

(5) The CPU 1782 takes into the contents of a value of the write pointer 1793 to obtain a writing position. After that, the contents of the pointer 1793 are incremented by only a size of the I/O buffer 1792.

(6) The CPU 1782 selects a pair of the write pointer (counter) 1794 and the region 1795 corresponding to a bucket into which the data is discharged.

(7) With the pair of the write pointer 1794 and the region 1795 selected in the process in the above item (6), an entry of the region 1795 indicated by the write pointer 1794 is selected, and the writing position obtained in the process in the above item (5) is written in this entry. After that, contents of the write pointer 1794 are incremented by only one entry.

(8) The CPU 1782 generates an input-output command used to store the contents of the I/O buffer 1792 into the writing position (a position on the secondary storage apparatus 1780) obtained in the process in the above item (5), and sends this command to the I/O circuit 1784.

(9) The CPU 1782 waits until receiving a termination signal from the control PM 1600 or an interruption signal representing an arrival of a new tuple from the network interface circuit 1781. If receiving a termination signal from the control PM 1600, the CPU 1782 performs the process in the above item (4) and forward on all unoccupied buffer 1791, releases internal control information excepting the write pointer (counter) 1794 and the region 1795, and sends a process termination report to the control PM 1600. Information stored in the write pointer 1794 and the region 1795 is an output of this process (the second step) as well as data stored in the region 1785 of the secondary storage apparatus 1780. By using these outputs, it is possible to read data of each bucket at a high speed in the next process.

As above, this embodiment contribute to a large reduction of a capacity of the main storage required by each PM configuring a parallel processor apparatus.

More specifically, a sum of capacities of the blocking buffers required to divide the buckets in this embodiment is $(m+n+2) \times$[I/O access unit] at most. Assuming here m=n, the value is approximately $2 \cdot $[a total number of buckets]$^{1/2} \cdot $[I/O access unit]. This value is heretofore [a total number of buckets]$\cdot$[I/O access unit]. The number of buckets is generally in an order of several hundreds. As an effect of reducing a capacity of the main storage according to this invention, it is possible to reduce capacities of the above blocking buffers required down to one-tenth or less.

Practically, if a database of a capacity 100 GB is handled with a PM having a main storage of a capacity 64 GB, the number of buckets is, in general, approximately 1600 which is a ratio between them. In addition, approximately 256 KB is so-called "a minimum capacity of an I/O access unit required to assure the performance" in a general I/O apparatus. Therefore, the existing technique requires a buffer of a capacity 400 MB for each PM. Such buffer causes inconsistency that it cannot be realized without a virtual storage mechanism. To the contrary, this invention requires a buffer of a capacity 20 MB for one PM even if the intermediate blocking PM group 150 and the receiver side PM group 70 are realized with the same PM, which can be realized on the main storage base.

From the above, if a technique of this invention is compared with the existing technique which provides blocking buffers in, for example, a virtual storage apparatus, an effect of an improvement in performance is in an order shown by the following equation:

[effect of improvement]=$R_s/(2 \cdot R_r)$ wherein, $R_s$ is a secondary storage performance if the demand for assuring the performance in terms of the I/O access unit is satisfied, and $R_r$ is a secondary storage performance if a random access process is performed on each tuple. Provided that an effective performance of $R_r$ is a value obtained by dividing a tuple length by a time required to perform a process by the virtual storage mechanism of reading a main storage page demanded once from the secondary storage mechanism and writing this page into the secondary storage after completion of the process by the upper application (a database management system in this case). If an access is truly at random and required capacities of the blocking buffers are excessively large as compared with a capacity of the main storage (such case is called a poor VR ratio), the effect of an improvement in performance is as above.

A value given by the above equation is approximately 450 in the case where an average tuple length is approximately 200 B. In consequence, a performance of the parallel processor apparatus of this invention is improved approximately 450 times.

According to this embodiment, in order to assure a sufficient bucket write/read performance, tuple groups (record groups) belonging to a certain bucket are stored on a storage (the I/O blocking buffers on the main storage) until a quantity of the tuple data becomes sizable, whereby a storage capacity of a storage required for a write process is suppressed when the tuple data is written into the secondary storage apparatus, as above.

According to the existing technique, a blocking work on a storage (a main storage) for assuring the above bucket write/read performance requires an enormous quantity of a storage, which is infeasible, as a result. However, this invention enables a blocking work for assuring a bucket write/read performance with a quantity of a storage (a main storage capacity) in an ordinary range, thus largely improving the bucket write/read performance as a result.

According to this embodiment, the number of PMs taking charge of a certain sort of bucket is not limited to one, but a load on each PM is leveled, thereby reducing the number of buckets handled by one PM and preventing occurrence of bias in loads among the PMs due to differences in capacity among the buckets generally occurring is prevented with certainty. This further prevents a reduction in entire throughput due to concentration of the load on a particular PM and contributes an improvement of the process performance.

The above embodiment has been described by way of a parallel processor apparatus in which the intermediate blocking PM group 150 in one stage is interposed between the transmitter side PM group 60 and the receiver side PM group 70. However, this invention is not limited to the above example. It is possible to configure the intermediate blocking PM group 150 in plural stages and root the number of buckets plural times, thereby complying with an extremely large number of buckets.

In the above embodiment, the first load leveling unit and the second load leveling unit are configured with the round robin pointers 1712 and 1773. However, this invention is not limited to the above example. As stated before, it is possible to use a table addressable with identifiers of each bucket and the intermediate blocking PMs and accumulating a quantity of data that should be sent to each of the intermediate blocking PMs 1500 through 1502 as a first load leveling unit, and use a table addressable with identifiers of each bucket and the receiver side PMs and accumulating a quantity of data that should be sent to each of the receiver side PMs 700 through 702 as a second load levelling unit.

In the above case, a quantity of sent data in each table is referred and the tuple data is sent to a PM having a least quantity of the send data, whereby the tuple data may be sent uniformly or approximately uniformly to each of the PMs to level a load on each of the PMs. This may also attain the same feature and effect as the above embodiment.

What is claimed is:

1. A parallel processor apparatus having plural processors operating in parallel, said plural processors joining to one task to execute said task as a whole, and data that is an object of a process for said task being handled as a data unit (hereinafter called a tuple) being able to be processed individually and separately in each of said processors, said parallel processor apparatus comprising:

a first processor group for distributing said data that is an object of the process to store said data in advance;

a second processor group for storing said data that is an object of the process sent from said first processor group in a state where said data is divided into buckets each of which is a set of tuples of the same sort;

an intermediate processor group included in said plural processors for receiving said data that is an object of the process from said first processor group to temporarily store said data therein, then sending said data to said second processor group;

a first dividing means for dividing said data that is an object of the process into plural sets of bucket groups each of which is a set of tuples of plural sorts when said data is transmitted from said first processor group to said intermediate processor group to temporarily store said data in said intermediate processor group; and a second dividing means for reading each of said plural sets of bucket groups divided by said first dividing means and temporarily stored in said intermediate processor group, dividing each of said bucket groups into buckets each of which is a set of tuples of the same sort when said data is transmitted from said intermediate processor group to said second processor group to store said buckets in said second processor group.

2. The parallel processor apparatus according to claim 1, wherein a grouping function used to classify each tuple composing said data that is an object of the process is set in advance in said first dividing means, and said first dividing means performs a bucket dividing process on the basis of a bucket identifier as an output value of said grouping function obtained by applying said grouping function to each tuple.

3. The parallel processor apparatus according to claim 1, wherein a grouping function used to classify each tuple composing said data that is an object of the process is set in advance in said second dividing means, and said second dividing means performs a bucket dividing process on the basis of a bucket identifier as an output value of said grouping function obtained by applying said grouping function to each tuple.

4. The parallel processor apparatus according to claim 2, wherein a grouping function used to classify each tuple composing said data that is an object of the process is set in advance in said second dividing means, and said second dividing means performs a bucket dividing process on the basis of a bucket identifier as an output value of said grouping function obtained by applying said grouping function to each tuple.

5. The parallel processor apparatus according to claim 1, wherein said plural processors have a control processor for managing conditions of operations of said first processor group, said second processor group and said intermediate processor group to make said first dividing means and said second dividing means execute dividing processes while synchronizing the operations of said first processor group, said second processor group and said intermediate processor group.

6. The parallel processor apparatus according to claim 2, wherein said plural processors have a control processor for managing conditions of operations of said first processor group, said second processor group and said intermediate processor group to make said first dividing means and said second dividing means execute dividing processes while synchronizing the operations of said first processor group, said second processor group and said intermediate processor group.

7. The parallel processor apparatus according to claim 3, wherein said plural processors have a control processor for managing conditions of operations of said first processor group, said second processor group and said intermediate processor group to make said first dividing means and said second dividing means execute dividing processes while synchronizing the operations of said first processor group, said second processor group and said intermediate processor group.

8. The parallel processor apparatus according to claim 4, wherein said plural processors have a control processor for managing conditions of operations of said first processor group, said second processor group and said intermediate processor group to make said first dividing means and said second dividing means execute dividing processes while synchronizing the operations of said first processor group, said second processor group and said intermediate processor group.

9. The parallel processor apparatus according to claim 1, wherein said first dividing means has a first load leveling means for sending tuples belonging to the same bucket group to each of said processors belonging to said intermediate processor group uniformly or approximately uniformly to level a load on each of said processors belonging to said intermediate processor group.

10. The parallel processor apparatus according to claim 2, wherein said first dividing means has a first load leveling means for sending tuples belonging to the same bucket group to each of said processors belonging to said intermediate processor group uniformly or approximately uniformly to level a load on each of said processors belonging to said intermediate processor group.

11. The parallel processor apparatus according to claim 3, wherein said first dividing means has a first load leveling means for sending tuples belonging to the same bucket group to each of said processors belonging to said intermediate processor group uniformly or approximately uniformly to level a load on each of said processors belonging to said intermediate processor group.

12. The parallel processor apparatus according to claim 4, wherein said first dividing means has a first load leveling means for sending tuples belonging to the same bucket group to each of said processors belonging to said intermediate processor group uniformly or approximately uniformly to level a load on each of said processors belonging to said intermediate processor group.

13. The parallel processor apparatus according to claim 5, wherein said first dividing means has a first load leveling means for sending tuples belonging to the same bucket group to each of said processors belonging to said intermediate processor group uniformly or approximately uniformly to level a load on each of said processors belonging to said intermediate processor group.

14. The parallel processor apparatus according to claim 6, wherein said first dividing means has a first load leveling means for sending tuples belonging to the same bucket group to each of said processors belonging to said intermediate processor group uniformly or approximately uniformly to level a load on each of said processors belonging to said intermediate processor group.

15. The parallel processor apparatus according to claim 7, wherein said first dividing means has a first load leveling means for sending tuples belonging to the same bucket group to each of said processors belonging to said intermediate processor group uniformly or approximately uniformly to level a load on each of said processors belonging to said intermediate processor group.

16. The parallel processor apparatus according to claim 8, wherein said first dividing means has a first load leveling means for sending tuples belonging to the same bucket group to each of said processors belonging to said intermediate processor group uniformly or approximately uniformly to level a load on each of said processors belonging to said intermediate processor group.

17. The parallel processor apparatus according to claim 1, wherein said second dividing means has a second load leveling means for sending tuples belonging to the same bucket group to each of said processors belonging to said second processor group uniformly or approximately uniformly to level a load on each of said processors belonging to said second processor group.

18. The parallel processor apparatus according to claim 2, wherein said second dividing means has a second load leveling means for sending tuples belonging to the same bucket group to each of said processors belonging to said second processor group uniformly or approximately uniformly to level a load on each of said processors belonging to said second processor group.

19. The parallel processor apparatus according to claim 3, wherein said second dividing means has a second load leveling means for sending tuples belonging to the same bucket group to each of said processors belonging to said second processor group uniformly or approximately uniformly to level a load on each of said processors belonging to said second processor group.

20. The parallel processor apparatus according to claim 4, wherein said second dividing means has a second load leveling means for sending tuples belonging to the same bucket group to each of said processors belonging to said second processor group uniformly or approximately uniformly to level a load on each of said processors belonging to said second processor group.

21. The parallel processor apparatus according to claim 5, wherein said second dividing means has a second load leveling means for sending tuples belonging to the same bucket group to each of said processors belonging to said second processor group uniformly or approximately uniformly to level a load on each of said processors belonging to said second processor group.

22. The parallel processor apparatus according to claim 6, wherein said second dividing means has a second load leveling means for sending tuples belonging to the same bucket group to each of said processors belonging to said second processor group uniformly or approximately uniformly to level a load on each of said processors belonging to said second processor group.

23. The parallel processor apparatus according to claim 7, wherein said second dividing means has a second load leveling means for sending tuples belonging to the same bucket group to each of said processors belonging to said second processor group uniformly or approximately uniformly to level a load on each of said processors belonging to said second processor group.

24. The parallel processor apparatus according to claim 8, wherein said second dividing means has a second load leveling means for sending tuples belonging to the same bucket group to each of said processors belonging to said second processor group uniformly or approximately uniformly to level a load on each of said processors belonging to said second processor group.

25. The parallel processor apparatus according to claim 9, wherein said second dividing means has a second load leveling means for sending tuples belonging to the same bucket group to each of said processors belonging to said second processor group uniformly or approximately uniformly to level a load on each of said processors belonging to said second processor group.

26. The parallel processor apparatus according to claim 10, wherein said second dividing means has a second load leveling means for sending tuples belonging to the same bucket group to each of said processors belonging to said second processor group uniformly or approximately uniformly to level a load on each of said processors belonging to said second processor group.

27. The parallel processor apparatus according to claim 11, wherein said second dividing means has a second load leveling means for sending tuples belonging to the same bucket group to each of said processors belonging to said second processor group uniformly or approximately uniformly to level a load on each of said processors belonging to said second processor group.

28. The parallel processor apparatus according to claim 12, wherein said second dividing means has a second load leveling means for sending tuples belonging to the same bucket group to each of said processors belonging to said second processor group uniformly or approximately uniformly to level a load on each of said processors belonging to said second processor group.

29. The parallel processor apparatus according to claim 13, wherein said second dividing means has a second load leveling means for sending tuples belonging to the same bucket group to each of said processors belonging to said second processor group uniformly or approximately uniformly to level a load on each of said processors belonging to said second processor group.

30. The parallel processor apparatus according to claim 14, wherein said second dividing means has a second load leveling means for sending tuples belonging to the same bucket group to each of said processors belonging to said second processor group uniformly or approximately uniformly to level a load on each of said processors belonging to said second processor group.

31. The parallel processor apparatus according to claim 15, wherein said second dividing means has a second load leveling means for sending tuples belonging to the same bucket group to each of said processors belonging to said second processor group uniformly or approximately uniformly to level a load on each of said processors belonging to said second processor group.

32. The parallel processor apparatus according to claim 16, wherein said second dividing means has a second load leveling means for sending tuples belonging to the same bucket group to each of said processors belonging to said second processor group uniformly or approximately uniformly to level a load on each of said processors belonging to said second processor group.

\* \* \* \* \*